United States Patent
Shiimori et al.

(10) Patent No.: US 7,043,527 B2
(45) Date of Patent: May 9, 2006

(54) SYSTEM AND METHOD FOR OFFERING INFORMATION SERVICE, METHOD OF ASSISTING INFORMATION RELEASE SERVICE, AND INFORMATION SHARING SERVER

(75) Inventors: Yoshiko Shiimori, Asaka (JP); Takashi Miyamoto, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 734 days.

(21) Appl. No.: 10/041,612

(22) Filed: Jan. 10, 2002

(65) Prior Publication Data

US 2002/0091766 A1   Jul. 11, 2002

(30) Foreign Application Priority Data

Jan. 10, 2001 (JP) ............................. 2001-002688
Jan. 15, 2001 (JP) ............................. 2001-006556

(51) Int. Cl.
G06F 15/16 (2006.01)

(52) U.S. Cl. ...................................... 709/203; 709/201
(58) Field of Classification Search ................ 709/201, 709/203, 216, 217, 218, 219; 707/10
See application file for complete search history.

(56) References Cited

U.S. PATENT DOCUMENTS

| | | | |
|---|---|---|---|
| 5,617,119 A | | 4/1997 | Briggs et al. |
| 5,870,737 A | * | 2/1999 | Dockter et al. .............. 707/4 |
| 5,918,010 A | * | 6/1999 | Appleman et al. .......... 709/203 |
| 6,026,433 A | | 2/2000 | D'Arlach et al. |

FOREIGN PATENT DOCUMENTS

EP     0 889 636 A2    1/1999

OTHER PUBLICATIONS

A. T. van Halteren et al.; Telecommunications Information Networking Architecture Conference Proceedings, Apr. 12, 1999, pp. 14-23.

(Continued)

*Primary Examiner*—Rupal Dharia
*Assistant Examiner*—Brian J. Gillis
(74) *Attorney, Agent, or Firm*—Birch, Stewart, Kolasch & Birch, LLP

(57) ABSTRACT

An image sharing server and a printer for carrying out a printing service in association with the image sharing server are prepared and planners are invited to develop planned pages on the image sharing server. Contribution of images from general users is accepted through registered planned pages, and a service for offering contributed images for pay (ordered printing, downloading, etc.) is developed. A manager of the image sharing server performs centralized management including carrying out services and collecting charges for the services. Instances of use of each service is totalized with respect to each planned page and with respect to each contributor, and portions of a profit made by offering the service are respectively returned to the corresponding planner and contributor. Each planner and each contributor are periodically notified of the totalization results. Thus, a system is provided in which each service planner can easily develop its original planned page without holding a individual data base server and a Web server of its own, and portions of a profit made by offering planned pages are respectively returned to the planner and contributors. Also, the manager of operations for the services in this system prepares a portal site server, a gallery provision server, a photograph storage server and a printing service provider on the Internet and invites contents providers to utilize the system. The printing service provider collects orders accepted through planned pages from users, performs printing according to the orders, and delivers finished prints to the users. In this system, a portal site service, a gallery provision service, a photograph storage service and page making GUI components provision service are offered to assist opening of a gallery page. Thus, finely divided functions and services for exhibiting contents such as photographs on the network are provided, thereby enabling each contents holder to easily develop a galley site.

18 Claims, 19 Drawing Sheets

FOREIGN PATENT DOCUMENTS

| | | |
|---|---|---|
| EP | 0 961 451 A2 | 12/1999 |
| JP | 2000 268164 | 9/2000 |
| WO | WO 00/57314 A2 | 9/2000 |
| WO | WO 00/67104 A1 | 11/2000 |
| WO | WO 00/70511 A1 | 11/2000 |

OTHER PUBLICATIONS

Peter M. Corcoran et al.; IEEE Transactions on Consumer Electronics, vol. 45, No. 3, Jun. 22, 1999, pp. 577-583.

Y. Zhao; IBM Systems Journal, vol. 37, No. 4, pp. 584-595.

* cited by examiner

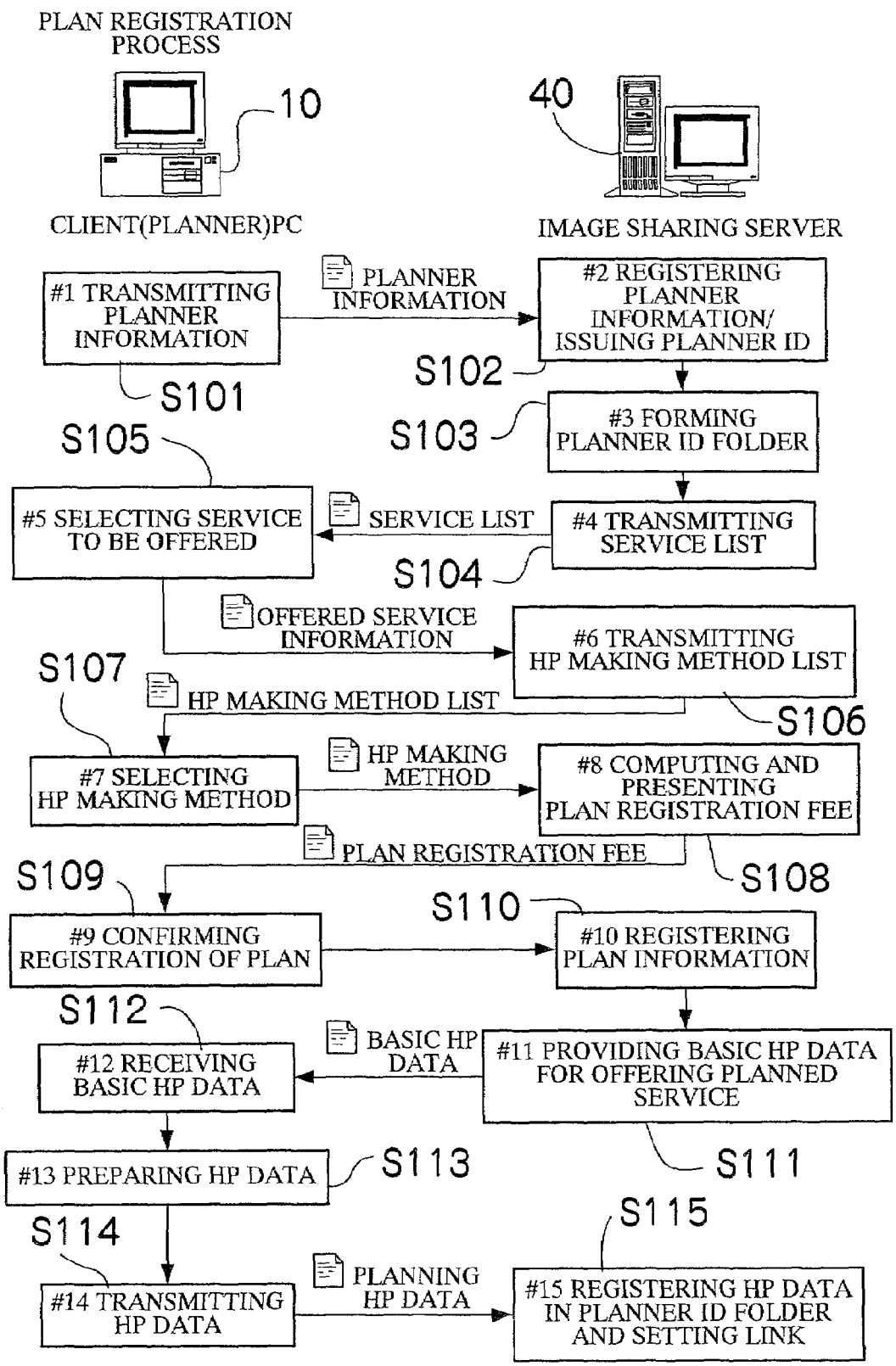

FIG.3

PLANNER MANAGEMENT TABLE (TABLE 1)

| MANAGEMENT ITEM | EXPLANATION |
|---|---|
| PLANNER ID | #2 ID UNIQUELY ISSUED TO EACH PLANNER AT THE TIME OF PLANNER ID ISSUING |
| PLANNER ORGANIZATION'S NAME | #1 INFORMATION INPUT BY PLANNER PC AT THE TIME OF TRANSMISSION OF PLANNER INFORMATION |
| PLANNER REPRESENTATIVE'S NAME | #1 INFORMATION INPUT BY PLANNER PC AT THE TIME OF TRANSMISSION OF PLANNER INFORMATION |
| PLANNER ORGANIZATION'S LOCATION | #1 INFORMATION INPUT BY PLANNER PC AT THE TIME OF TRANSMISSION OF PLANNER INFORMATION |
| PLANNER ORGANIZATION CONTACT PLACE (TELEPHONE NUMBER) | #1 INFORMATION INPUT BY PLANNER PC AT THE TIME OF TRANSMISSION OF PLANNER INFORMATION |
| PLANNER REPRESENTATIVE'S E-MAIL ADDRESS | #1 INFORMATION INPUT BY PLANNER PC AT THE TIME OF TRANSMISSION OF PLANNER INFORMATION |
| CREDIT NUMBER OF SETTLEMENT | #1 INFORMATION INPUT BY PLANNER PC AT THE TIME OF TRANSMISSION OF PLANNER INFORMATION |
| MONEY-RECEIVING ACCOUNT NUMBER | #1 INFORMATION INPUT BY PLANNER PC AT THE TIME OF TRANSMISSION OF PLANNER INFORMATION |

FIG.4

SERVICE MANAGEMENT TABLE (TABLE2)

| MANAGEMENT ITEM | EXPLANATION |
|---|---|
| KIND OF SERVICE#1 | KIND OF SERVICE OFFERABLE BY IMAGE SHARING SERVER EXAMPLES: "L-SIZE PRINTING SERVICE [DSC SIZE PRINTING SERVICE] DOWNLOADING SERVICE" |
| SERVICE SETTING COST | COST OF SETTING SERVICE ON PLANNED PAGE COST TO BE PAID TO IMAGE SHARING SERVER MANAGER BY PLANNER WHEN PLANNED PAGE IS OPENED |
| SERVICE OFFER COST | CHARGE TO BE PAID BY GENERAL USER FOR USE OF SERVICE |
| RETURN AMOUNT | AMOUNT OF MONEY TO BE RETURNED TO PLANNER AND CONTRIBUTOR WHEN GENERAL USER USES SERVICE |

FIG.5

HP MAKING METHOD MANAGEMENT TABLE(TABLE3)

| MANAGEMENT ITEM | EXPLANATION |
|---|---|
| HP MAKING METHOD | EXAMPLE: (LOGO ONLY \|HP DESIGN \| HP FUNCTION PREPARATION) |
| SETTING COST | COST OF SETTING PLANNED PAGE CHARGE TO BE PAID TO IMAGE SHARING SERVER MANAGER WHEN PLANNED PAGE IS OPENED |

FIG.6

PLAN MANAGEMENT TABLE (TABLE4)

| MANAGEMENT ITEM | EXPLANATION |
|---|---|
| PLANNER ID | #PLURALITY OF DATA ITEM EXIST WITH RESPECT TO PLANNER WHO DEVELOPS PLURALITY OF SERVICES |
| KIND OF SERVICE | ITEM"KIND OF SERVICE #1" IN TABLE2 (KIND OF SERVICE SELECTED BY PLANNER) |
| PLANNER RETURN AMOUNT | AMOUNT OF MONEY TO BE RETURNED TO PLANNER WHEN GENERAL USER USES SERVICE |
| CONTRIBUTOR RETURN AMOUNT | AMOUNT OF MONEY TO BE RETURNED TO CONTRIBUTOR WHEN GENERAL USER USES SERVICE |

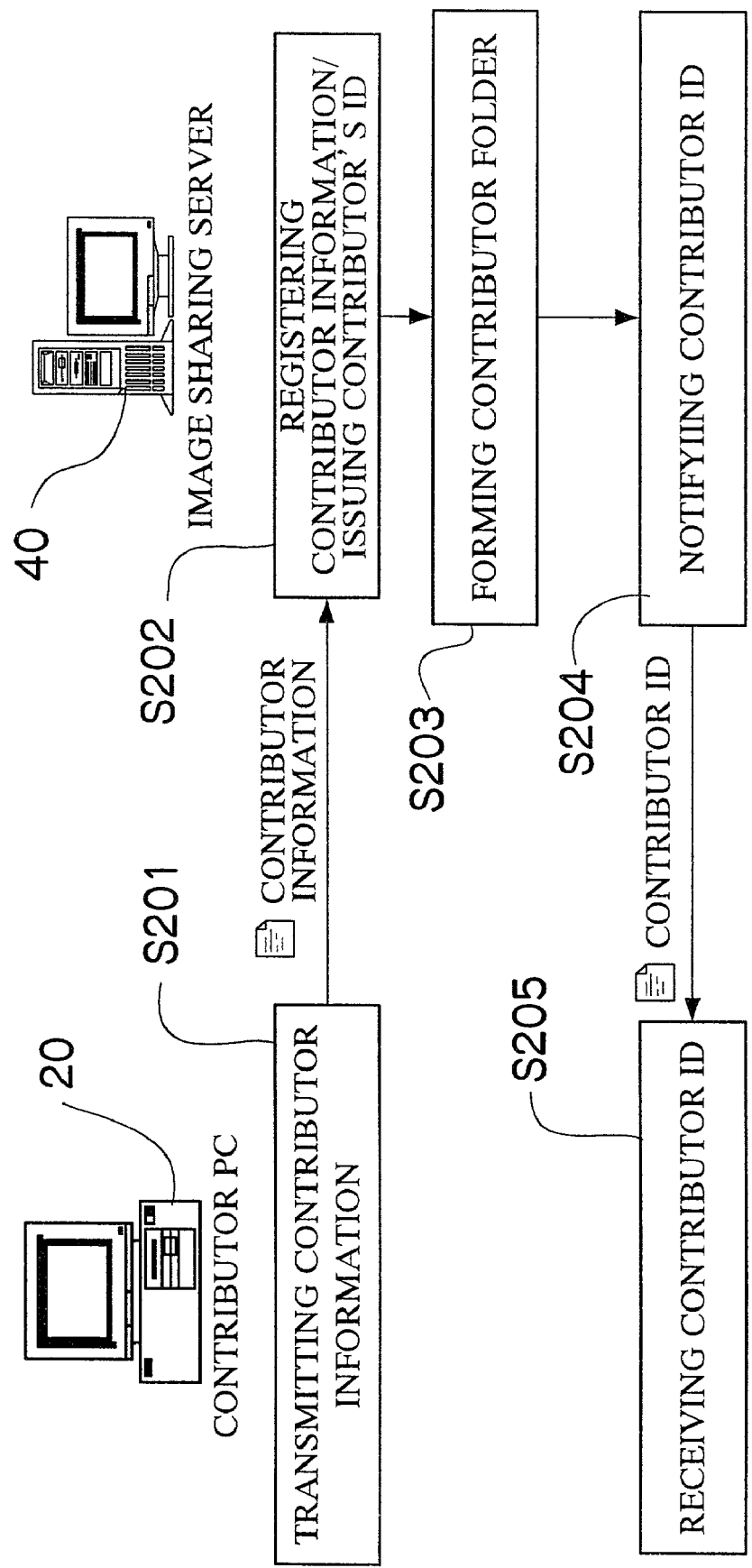

FIG.8

CONTRIBUTOR MANAGEMENT TABLE (TABLE 5)

| MANAGEMENT ITEM | EXPLANATION |
|---|---|
| CONTRIBUTOR ID | #2 ID UNIQUELY ISSUED TO EACH CONTRIBUTOR AT THE TIME OF CONTRIBUTOR ID ISSUING |
| CONTRIBUTOR'S NAME | #1 INFORMATION INPUT BY CONTRIBUTOR PC AT THE TIME OF TRANSMISSION OF CONTRIBUTOR INFORMATION |
| ADDRESS | #1 INFORMATION INPUT BY CONTRIBUTOR PC AT THE TIME OF TRANSMISSION OF CONTRIBUTOR INFORMATION |
| TELEPHONE NUMBER | #1 INFORMATION INPUT BY CONTRIBUTOR PC AT THE TIME OF TRANSMISSION OF CONTRIBUTOR INFORMATION |
| E-MALE ADDRESS | #1 INFORMATION INPUT BY CONTRIBUTOR PC AT THE TIME OF TRANSMISSION OF CONTRIBUTOR INFORMATION |
| MONEY-RECEIVING ACCOUNT NUMBER | #1 INFORMATION INPUT BY CONTRIBUTOR PC AT THE TIME OF TRANSMISSION OF CONTRIBUTOR INFORMATION |

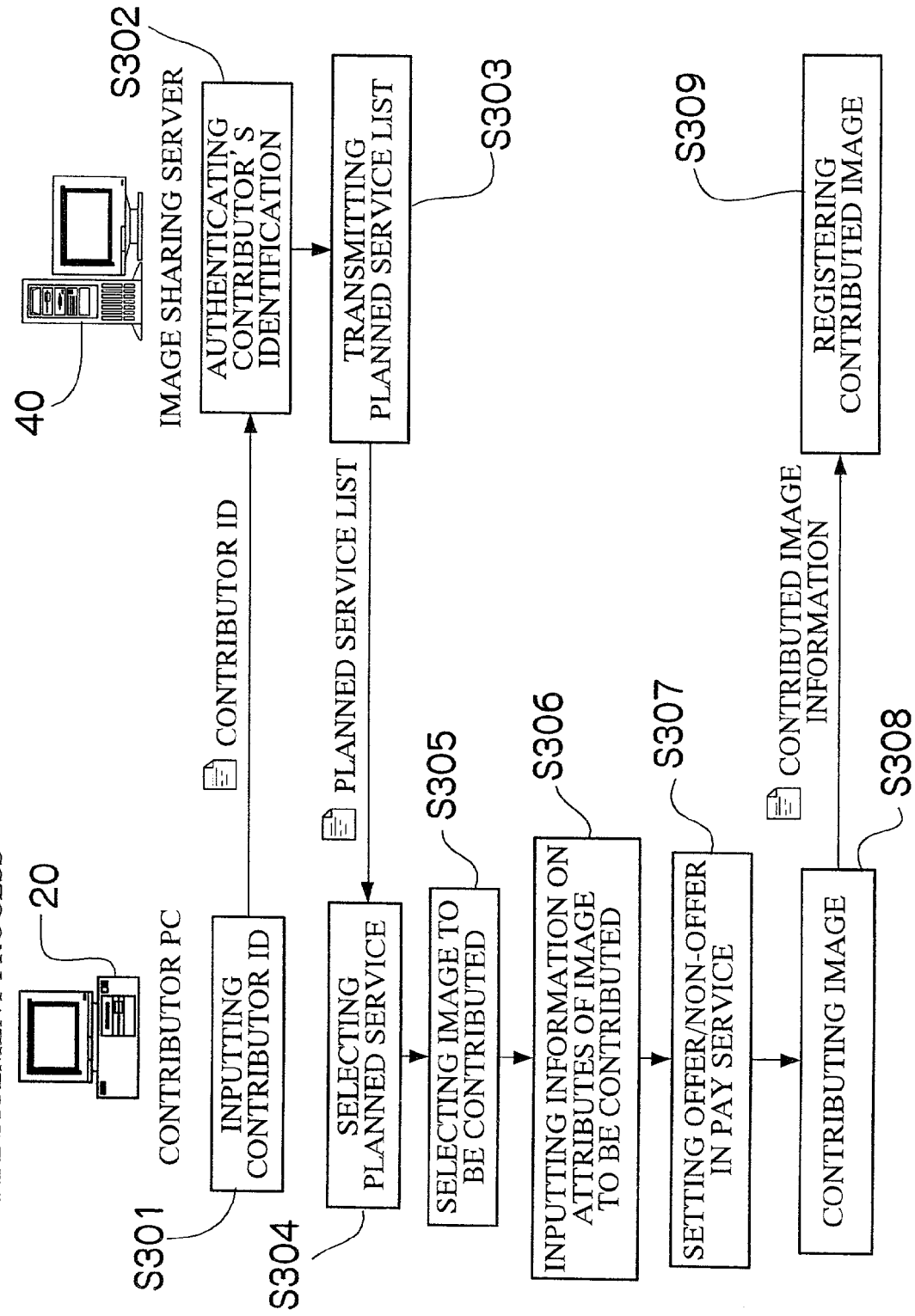

FIG.10

CONTRIBUTED IMAGE MANAGEMENT TABLE(TABLE6)

| MANAGEMENT ITEM | EXPLANATION |
|---|---|
| IMAGE ID | UNIQUE ID ATTACHED TO CONTRIBUTED IMAGE |
| PLANNER ID | PLANNER ID OF PLAN SELECTED BY CONTRIBUTOR |
| CONTRIBUTOR ID | IMAGE CONTRIBUTOR ID |
| IMAGE LOCATION | ADDRESS OF PLACE WHERE CONTRIBUTED IMAGE IS STORED |
| ATTRIBUTE INFORMATION(PLURAL) | CONTRIBUTED IMAGE ATTRIBUTE INFORMATION INPUT AT #6 |
| OFFER/NON-OFFER IN PAY SERVICE | INFORMATION SET AT #7 WHETHER OR NOT CONTRIBUTED IMAGE WILL BE OFFERED IN PAY SERVICE EXAMPLE OF PAY SERVICE: ORDERED PRINTING, DOWNLOADING |

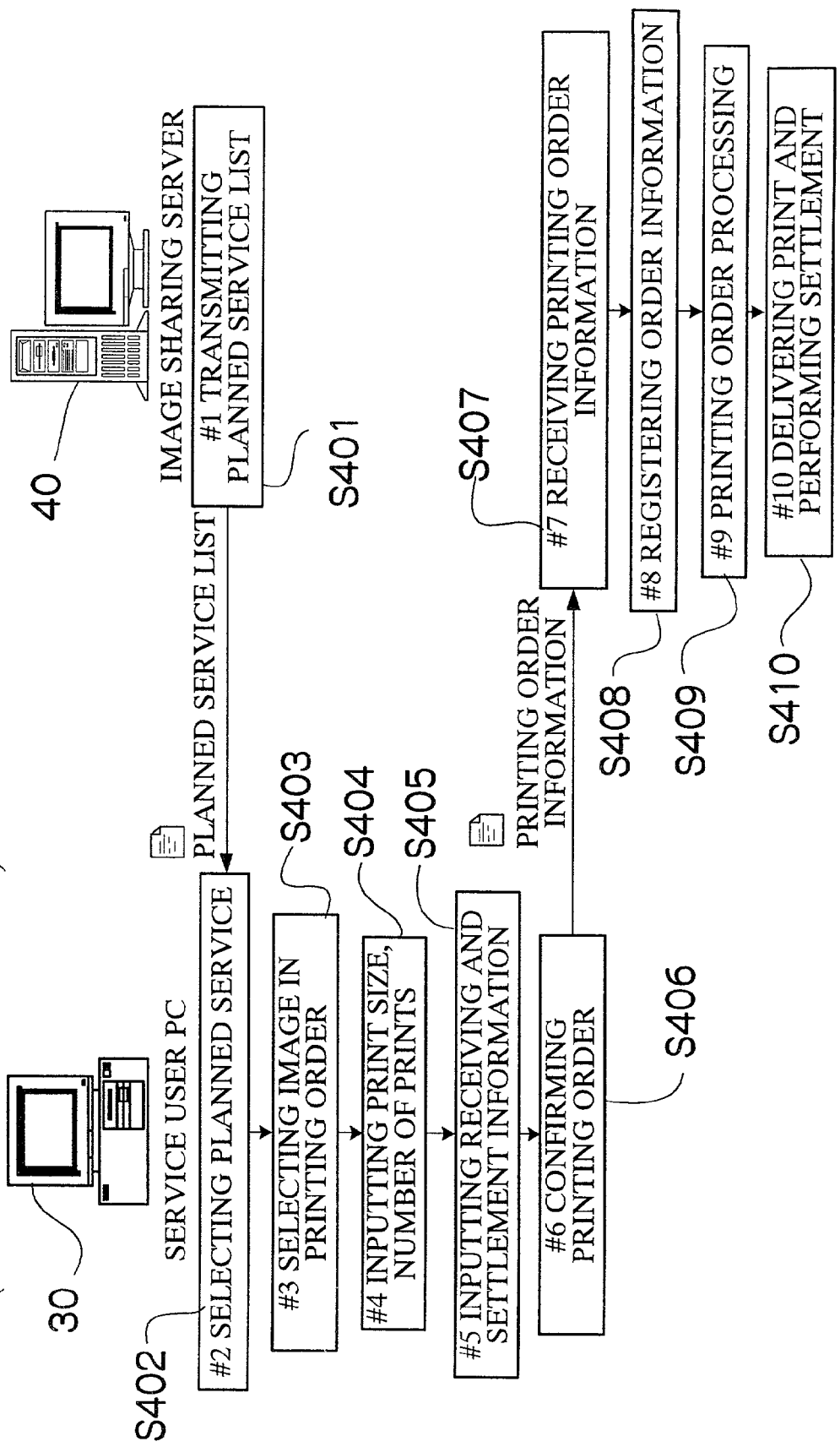

FIG.12

ORDER MANAGEMENT TABLE(TABLE7)

| MANAGEMENT ITEM | EXPLANATION |
|---|---|
| ORDER ID | UNIQUE ID ATTACHED TO ONE ORDER |
| IMAGE ID | IMAGE ID OF ORDERED IMAGE |
| KIND OF ORDER | ITEM"KIND OF SERVICE #1"IN TABLE2 (KIND OF SERVICE SELECTED BY USER) |
| NUMBER OF ORDERS | NUMBER OF ORDERS OR NUMBER OF PRINTS IN THE CASE OF PRINTING ORDER |
| ORDER PRICE | WITH RESPECT TO KIND OF SERVICE CORRESPONDING TO THAT IN TABLE2, SERVICE OFFER PRICE × NUMBER OF ORDERS |
| ORDER ACCEPTANCE DATE | DATE OF ACCEPTANCE OF ORDER |

FIG.13

SETTLEMENT MANAGEMENT TABLE(TABLE8)

| MANAGEMENT ITEM | EXPLANATION |
|---|---|
| ORDER ID | UNIQUE ID ATTACHED TO ONE ORDER |
| TOTAL ORDER PRICE | TOTAL AMOUNT FROM CORRESPONDING ORDERS SUM OF ORDER PRICES FROM TABLE7 WITH RESPECT TO CORRESPONDING ORDER ID |
| RECEIVING INFORMATION | DELIVERY DESTINATION ADDRESS, TELEPHONE NUMBER, NAME |
| CREDIT CARD NUMBER FOR SETTLEMENT | CREDIT CARD NUMBER FOR ORDER SETTLEMENT |
| PROCESSING STATE | UNPROCESSED\| ORDERED PROCESSING COMPLETED \|SETTLEMENT COMPLETED\| RETURN TO PLANNER COMPLETED\| RETURN TO CONTRIBUTOR COMPLETED |

SYSTEM AND METHOD FOR OFFERING INFORMATION SERVICE, METHOD OF ASSISTING INFORMATION RELEASE SERVICE, AND INFORMATION SHARING SERVER

BACKGROUND OF THE INVENTION

1. Field of the Invention

The present invention relates to a system in which electronic information such as image data and sound data is registered through a network, e.g., the Internet to be shared and utilized, and to a system for releasing digital information, e.g., image data (contents). More particularly, the present invention relates to techniques for returning to a profit made by developing a pay service such as a printing service or a data selling service to a planner or contributor (provider) who planned the service or provided information, and to a system and the configuration of a system suitable for development of an image selling service including releasing and selling images in the form of a print and in other output forms.

2. Description of the Related Art

Japanese Patent Application Publication No. 2000-268164 discloses techniques relating to a server system for registration and sharing of images through a network. With the recently developed Internet technology in the background, there is a demand for buying and selling on the Net of digital information such as image data and music data in the possession of enterprises and individual persons.

However, if a conventional image registration/sharing system is used to enable a planner planning provision of an information service to develop a planned page (home page on the Web), there is a need to construct a server system necessary for offering the service and to improve the existing system and, hence, a need for complicated management of the systems, which is considerably burdensome to a server manager.

For this reason, a planner who failed to obtain a server manager's consent to a plan has no way of carrying out the plan other than purchasing a high-priced set of a data server and a Web server to construct a service system by itself. It is not possible for a planner such as a small entrepreneur weak in financial strength to develop a planned page.

Even in a case where a planned page developed under a server manager is utilized so widely that a substantial profit is made by selling (secondary use), etc., of registered images, the profit is taken mainly by the server manager and it is difficult to return some portion of the profit to the planner or the image provider.

On the Internet, many service sites exist presently where a service for making an "album" for storing photographs is offered. Such service sites are planned mainly for the purpose of preserving electronic images in electric albums on a server.

Conventional album service sites are managed by photography studios, camera makers, specialized venture enterprises, etc. On the other hand, contents holders, e.g., theatrical agencies and professional photographers keep photographs to be sold. It costs a contents holder a lot of money to independently prepare a server, etc., and to manage an image release system on the network. Therefore it is desirable for contents holders to provide only contents and to release and sell images by using an album service site managed by an external corporation.

The systems for conventional album sites, however, have been planned basically for private photograph albums and specified so that only images to be released at a user's wish, among those registered in an album, are objects of release on the network. Such system specifications which inhibit release of contents in principle are inconvenient for commercial contents holders who intend mainly to release and sell images.

Also, for general users who need albums for accumulating electronic images, the method of holding electronic images on a local (user's own) computer is more convenient in terms of access speed, screen customization flexibility, etc. It is not practically necessary for a user to hold on the network his or her private album storing images not to be seen by others.

In short, it is thought that the conventional systems have been planned as a substitute for "private" and "closed" albums and the fundamental planning policy is not reasonable.

SUMMARY OF THE INVENTION

In view of the above-described circumstances, an object of the present invention is to provide an arrangement for enabling a service planner to easily develop an original planned page without holding a data base server and a Web server of its own, and an arrangement for returning a profit made by utilization of the planned page to the planner and to an image contributor.

Another object of the present invention is to provide a system capable of offering a contents holder functions and a service for releasing photographs, etc., on a network by providing finely divided functions and services to assist the contents holder in constructing a gallery site (a photograph exhibition site on the network) by itself.

To achieve the above-described objects, the present invention is directed to an information service offering system for realizing a service to receive information from contributors through a network and to offer the contributed information to a third party for pay, the information service offering system comprising: communication units for contributors; communication units for planners who plan services; communication units for service users who will purchase contributed information; an information sharing server; and a service execution device which executes provision of information to a service user on the basis of a request from the service user, wherein: the communication units for the contributors, the communication units for the planners, the communication units for the service users and the information sharing server are communicably connected to each other through a network; the information sharing server comprises: a plan registration device which registers information about each of the planners at a request from the planner; a plan exhibition device which shows planned pages opened by the planners to the service users; a contributor management device which manages the contributors who contribute information to the planned pages; a contributed information management device which manages the information contributed by the contributors; a service management device which accepts orders from the service users and manages in accordance with each order the corresponding service executed by the service execution device; a profit management device which manages a profit obtained as a charge for use of each service; a service use instance totalization device which totalizes instances of use of the service registered on the information sharing server and developed by each planner and instances of use of the contributed information with respect to each planner and with respect to each contributor; and a profit return amount computation device which computes, on the basis of the results of totalization obtained by the service user instance totalization device, an amount of money to be returned to each planner and an amount of money to be returned to each contributor as portions of a profit made by setting the contributed information; each of the communication units for the planners includes a device which transmits, to the information sharing server, data for application of registration of each planned page and the corresponding planner information in the information sharing server; each of the communication units for the contributors includes a device which transmits, to the information sharing server, contributed information treated as an object to be offered for pay and corresponding contributor information; and each of the communication units for the service users includes a device which transmits order data for purchasing desired contributed information by accessing the corresponding planned page opened by the planner.

In the information service offering system in accordance with the present invention, the information sharing server and the service execution device capable of operating associably with the information sharing server are prepared on the server manager side, and registration of planners (plans) who have planned original services is invited. Each planner registers a planned page on the information sharing server and widely accepts contribution of information on the network through the planned page. The planner may open the planned page on a server of its own. However, the management load on the planner can be lightened if the planned page is opened on the information sharing server.

Preferably, each planner is provided with making assistant means such as templates and making tools for making its planned page from the information sharing server side to make the planned page more easily.

Preferably, each contributor selects, according to its preference, some of the planned pages registered on the information sharing server, and contributes digital information (images, sounds, computer programs, etc.) in its possession to the planned page. To enable contribution, registration of the contributor in the information sharing server is required. The contributed information is exhibited on the network as an object offerable for pay.

Preferably, each service user selects, according to its need, one of the planned pages registered in the information sharing server, selects information which the user wishes to purchase, and makes an order for purchase. Data on orders made by users are collectively managed in the information sharing server. The manager of the information sharing server alone executes the services according to orders and collects charge settlement operations for each planner.

Preferably, the information sharing server totalizes instances of use of services with respect to each planned page and with respect to each contributed piece of information to compute amounts of money to be returned as portions of a profit to the corresponding planner and contributor. The manager of the server returns to the planner and contributor the portions of the profit made by offering the pay service on the basis of the results of computation of the return amounts. Thus, proper portions of the profit are returned to the planners and contributors according to instances of use of the services.

Preferably, a contract is made with respect to the return amount at the time of planner registration and at the time of contributor registration, and the amount of money to be returned is computed according to this setting. The setting of the contract with respect to the return amount can be changed when necessary after registration. It is preferable to change for each service the charge by referring to the state of use of the service.

Preferably, the information sharing server has a means for periodically notifying each planner and each contributor of the results of totalization by the service use instance totalization means. The results of totalization by the service use instance totalization means may be distributed to the communication units for the planner and contributor through the network. A report (written notice) on the state of use or the like may be sent by mail.

The present invention is also directed to an information service offering method in which a planner is assisted in realizing a service when the planner develops the service by receiving information from contributors through a network and by selling the contributed information to a third party, the method comprising the steps of: preparing an information sharing server and a service execution device which actually offers a service user some of services planned by planners and registered in the information sharing server, and inviting registration of plans in the information sharing server; registering information about each planner planning a service on the information sharing server at a request from the planner; opening a planned page for development of the service planned by the planner; accepting contribution of information from contributors through the planned page; registering information about each contributor on the information sharing server; storing and managing the information contributed by the contributors; accepting an information purchase order from a service user through the planned page; executing the service to provide, by the service execution device, the contributed information designated by the order from the service user; performing settlement of a charge for the service offered to the service user; totalizing instances of use of the service registered and developed by each planner and instances of use of contributed information with respect to each planner and with respect to each contributor; computing, on the basis of the results of totalization in the totalization step, an amount of money to be returned to each planner and an amount of money to be returned to each contributor as portions of a profit made by the service of providing the contributed information; and returning portions of the profit to each planner and each contributor according to the results of computation in the computation step.

The present invention is also directed to an information sharing server, comprising: a plan registration device which registers information about each of planners at a request from the planner, the planner planning to develop a service by accepting information from contributors through a network and by selling the contributed information to a third party; a plan exhibition device which shows planned pages opened by the planners to the service users; a contributor management device which manages the contributors who contribute information to the planned pages; a contributed information management device which manages the information contributed by the contributors; a service management device which accepts orders from the service users via a network and manages in accordance with each order the corresponding service executed by a service execution device; a profit management device which manages a profit obtained as a charge for use of each service; a service use instance totalization device which totalizes instances of use of the service registered on the information sharing server and developed by each planner and instances of use of the contributed information with respect to each planner and with respect to each contributor; a profit return amount computation device which computes, on the basis of the results of totalization obtained by the service user instance totalization device, an amount of money to be returned to each planner and an amount of money to be returned to each contributor as portions of a profit made by selling the contributed information; and a use instance notification device which periodically notifies each planner and each contributor of the results of totalization obtained by the service use instance totalization device.

The present invention is also directed to an information service offering system for realizing a service to offer information to a third party by means of a network, the information service offering system comprising: at least one planned page opening server which enables each of a plurality of contents providers planning information offering services to exhibit, on the network, information selected as an object to be offered, and enables the planner to individually open a home page for accepting orders from users; a data storage device which stores digital data forming the information to be offered; a communication unit which accesses the home page through the network to enable reading of information, input of an order, and transmission of data relating to the input order; and a service execution device which executes a service by operating associably with home pages opened by the plurality of contents providers to perform centralized management of orders accepted through the home pages, by converting the information designated by each order into a predetermined form in accordance with the order such as to be receivable by the corresponding user, and by delivering the converted data to the user.

In the information service offering system in accordance with the present invention, a plurality of contents providers planning information offering services individually open their original home pages for service development (planned pages) on the server on the network (planned page opening server). Data forming the information exhibited on each planned page is stored in the data storage device (e.g., a data storage server) and is referred to when necessary.

Preferably, an ordinary user browses the planned pages of the contents providers via the network by using the communication unit, selects information according to his or her need, and designates a designates an output format in which the information will be output. Order data input by the user is sent to the service execution device (e.g., a server of a service provider) and the service execution device executes the service to offer the information in the output format in accordance with the order.

Preferably, the manager who operates this system prepares the planned page opening server, the data storage device and the service execution device on the network and invites a number of contents providers to user these devices, thereby enabling the contents providers to easily open their original pages and to develop the information offering service.

This system also has the advantage of enabling an entrepreneur who owns the service execution device to accept an increased number of customers because of the centralized order processing linked to a plurality of home pages.

Preferably, information on an order accepted from a user on each home page is converted into order data in a common format, and the order data in conformity with the common format is sent to the service execution device. It is preferable to unify order data in order to enable the service execution device to perform centralized processing of orders in association with a multiplicity of home pages. Thus, the efficiency of order processing in the service execution device is improved.

Preferably, the cost of provision of information to a user for pay is determined by each contents provider according to the contents of the information, and the order data includes at least information for identification of the contents provider, information showing details of the order and information showing the cost.

Preferably, the price of information can be freely determined by each contents provider according to the value of information. On the other hand, the service execution device performs the operations for converting information relating to an order into a designated output format, and outputting the converted information. The cost of these operations is computed according to the output format (irrespective of the value of information). Therefore, each time the service is executed in accordance with an order, the service execution device is notified of the price of information.

Preferably, at this time, the service execution device issues a bill for charging the user an amount of money to be paid in the name of the contents provider on the basis of the information for identification of the contents provider and the information showing the cost. For example, the service execution device sends to the user a bill on which a bank account number for payment to the contents provider. Thus, the operation load on the contents provider is further reduced.

The present invention is also directed to an information release service assistance method which assists development of an information release service for releasing information to a third party through a network, the method comprising preparing on the network: a planned page provision server for providing a place where a home page for exhibiting information to be offered on the network is opened by each of a plurality of contents providers planning information release services; a data storage server which stores digital data forming the information to be offered; and a portal site server for opening a portal site in which a link to each of home pages opened by the contents providers is registered, wherein the method provides to each of the contents providers at least one of a service enabling use of the planned page provision server, a service enabling use of the data storage server, and a service enabling registration in the portal site on the basis of a contract.

Preferably, one who carries out the information release service assistance method of the present invention to conduct a service to assist contents providers in performing service operations constructs an assistant system by preparing on the network the planned page provision server, the data storage server, and the portal site server, and invites contents providers to use the assistant system by showing to the content providers a finely itemized service menu containing the planned page provision server use service, the data storage service, and the portal site service.

Preferably, each contents provider may individually open its planned page. However, if it makes a contract for use of the planned page provision server, it can open the planned page more easily.

Preferably, an advertisement service is executed to provide a place for advertisement to the contents provider under the contract for use of the planned page provision server. For example, since an ordinary user first visits the portal site and then makes a jump to some planned page according his or her need, an advertisement space in the portal site may be offered for pay.

Preferably, a service execution device is prepared to assist each contents provider in carrying out an information selling service such that information exhibited on the home page opened by the contents provider is offered for pay at a request from a user, the execution device operating associably with the home pages opened by the contents providers to perform centralized management of orders accepted through the home pages, converting the information designated by each order into a predetermined form in accordance with the order such as to be receivable by the corresponding user, and delivering the converted data to the user. The service execution device executes the information selling service for the contents provider on the basis of a contract. Thus, each contents provider is enabled to easily develop information selling operations.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a diagram showing a plan registration process in the image sharing server;

FIG. 3 is a diagram showing the composition of a planner management table (table 1);

FIG. 4 is a diagram showing the composition of a service management table (table 2);

FIG. 5 is a diagram showing the composition of a home page (HP) making method management table (table 3);

FIG. 6 is a diagram showing the composition of a plan management table (table 4);

FIG. 7 is a diagram showing a contributor registration process in the image sharing server;

FIG. 8 is a diagram showing the composition of a contributor management table (table 5);

FIG. 9 is a diagram showing a contributed image management process in the image sharing server;

FIG. 10 is a diagram showing the composition of a contributed image management table (table 6);

FIG. 11 is a diagram showing a pay service management process in the image sharing server;

FIG. 12 is a diagram showing the composition of an order management table (table 7);

FIG. 13 is a diagram showing the composition of a settlement management table (table 8);

DETAILED DESCRIPTION OF THE PREFERRED EMBODIMENTS

Preferred embodiments of a system and method for offering information service and an information sharing server in accordance with the present invention will be described below in detail with reference to the accompanying drawings.

Figure 1:
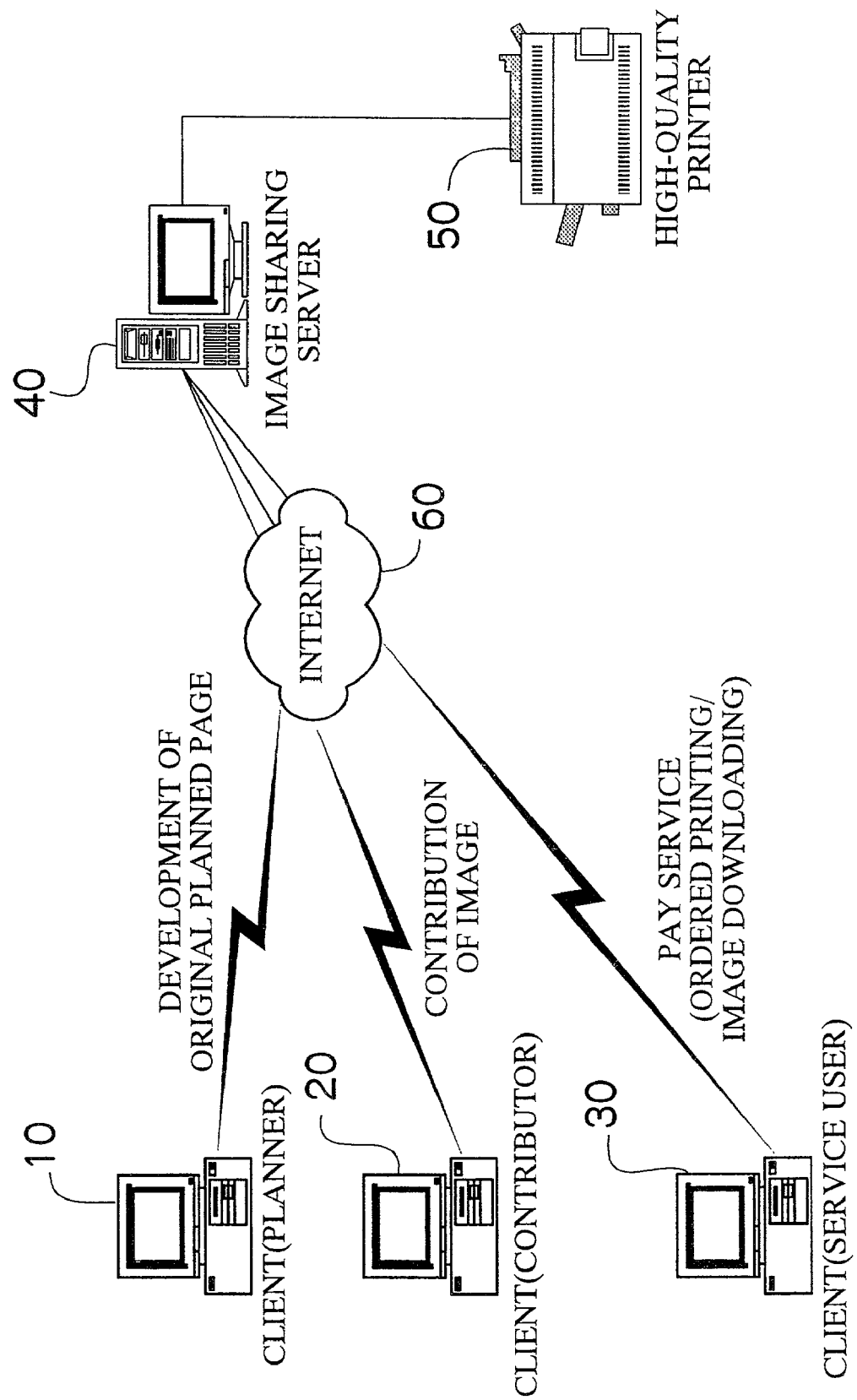
FIG. 1 is a diagram schematically showing an image service offering system which represents a first embodiment of the present invention.

FIG. 1 is a diagram schematically showing an image service offering system which represents a first embodiment of the present invention. This system is constituted by client computers 10, 20, and 30, an image sharing server 40, and a high-image-quality printer 50. Each client computer is capable of mutual data communication with the image sharing server 40 through a network 60, e.g., the Internet.

The client computer indicated by reference numeral 10 is a computer used by a planner who develops an original planned page (hereinafter referred to as "planner computer"). Although only one planner computer is shown in FIG. 1, a plurality of planners actually exist and each planner can develop an original planned image. Each planner sets up an original planned page on the image sharing server 40, and develops a service based on widely accepting contributed images from the network, releasing the contributed images on the planned page, and selling the images to third parties.

The client computer indicated by reference numeral 20 is a computer used by an image contributor (provider) (hereinafter referred to as "contributor computer"). Although only one contributor computer is shown in FIG. 1, a plurality of contributors actually exist and each contributor contributes images in its possession to a planned page selected by the contributor.

The client computer indicated by reference numeral 30 is a computer used by a service user (hereinafter referred to as "user computer"). Although only one user computer is shown in FIG. 1, a plurality of service users actually exist. Each service user uses a pay service, e.g. an on-order printing service or an image downloading service from a planned page selected by the user, and pays a charge for the service.

The image sharing server 40 has a plan registration function, a contributor registration function, a contributed image management function, a pay service management function, a service use instance totalization/management function, etc.

The "plan registration function" is a function for managing planners and planned pages by developing each planner's original planned page on the image sharing server 40 and collecting images through the original plans. The "contributor registration function" is a function for managing contributors who select according to their preferences some of a plurality of planned pages developed on the image sharing server 40 and contributes images to the selected page. The "contributed image management function" is a function for managing images contributed by contributors registered in the image sharing server 40 to planned pages selected by the contributors according to their preferences. The "pay service management function" is a function for managing services (on-order printing service, downloading service, service to sell recording media having copied data recorded thereon, etc.) offered to general users (service users) for pay by planners through planned pages. For example, when a print ordering instruction is received from a service user, print ordering processing is executed and the ordered image is printed with a printer 50. Then delivery of the print and settlement processing are performed. The "service use instance totalization/management function" is a function for totalizing instances of use of pay services with respect to each planned page and each contributor to calculate amounts of money to be returned from a profit to the planner and to the contributor, and for notifying the planner and contributor of the results of totalization.

These functions will be described below in detail.

<Plan Registration Function>

FIG. 2 is a diagram showing a plan registration process. First, planner information about one planner is input to the planner PC 10 and is transmitted to the image sharing server 40 (step S101). The planner information includes a planner organization's name, a planner representative's name, a planner organization's location (address), a planner organization contact place (telephone number), a planner representative's electric mail address, a credit number for settlement, and a money-receiving account number.

The image sharing server 40 receives and registers the planner information and issues individual identification information for identification of the planner (planner ID) on the basis of the planner information (step S102). FIG. 3 shows the composition of a planner management table (table 1). "Planner ID" denotes an ID for uniquely identifying each planner. A planner ID is a unique (nonduplicated) ID issued for each planner at the time of the above-described planner ID issuing in step S102 shown in FIG. 2. Management of any of the details of planned services, contributed images, the states of use of pay services, etc., is performed by using planner IDs.

In the planner management table shown in FIG. 3, the information items input to the planner PC 10 at the time of the above-described planner information transmission in step S101 shown in FIG. 2 are respectively stored as management items: "planner organization's name", "planner representative's name", "planner organization's location", "planner organization contact place (telephone number)", "planner representative's electric mail address", "credit number for settlement", and "money-receiving account number".

Subsequently to step S102 shown in FIG. 2, a planner ID folder is formed in the image sharing server 40. The planner ID folder is a folder for management of data for a home page (HP) through which a service developed by the planner is offered. The planner ID folder is formed in the image sharing server 40 simultaneously with planner registration and planner ID issuing. When the planner transmits HP data to the image sharing server 40, the HP data is stored in the corresponding planner ID folder and a link to the planner ID folder is formed on an image sharing server TOP page held by the server manager (see step S115).

After the formation of the planner ID folder, the image sharing server 40 transmits to the planner PC 10 a list of services which can be offered by the server (S104). The service list includes information on kinds of service, service setting costs, service offer costs, and amounts to be returned. The image sharing server 40 manages in a service management table the services which can be offered by the server. FIG. 4 shows the composition of the service management table (table 2).

As an item "kinds of service", information on the kinds of services which can be offered by the image sharing server 40 is stored. For example, three kinds of service: L-size printing service, DSC-size printing service, and downloading service may be offered. "Service setting cost" denotes the cost of setting of a service on a planned page, which is paid to the image sharing server manager at the time of starting the planned page. "Service offer cost" denotes an amount of money to be paid by a general user (service user) when the user uses a service. "Amount to be returned" denotes an amount of money to be returned to a planner and a contributor when a general user uses a service.

The planner receiving the above-described service list in step S104 shown in FIG. 2 selects from the service list a service to be developed on the planned page (step S105). The planner performs this selection by referring to the service setting costs, offer costs and return rates shown in the list, and sets an amount of money to be paid to the contributor with respect to the service to be developed. Information on the service thus selected by the planner to be offered is transmitted to the image sharing server 40. The information on the service to be offered includes the planner ID, the kind of service and the amount to be returned to the contributor.

Next, the image sharing server 40 provides the planner with means for making a planned HP. That is, the image sharing server 40 transmits a HP making method list to the planner PC 10 (step S106). The HP making method list includes information on HP making methods and setting costs. The image sharing server 40 manages, in a HP making method management table, HP making methods which can be presented from the server. FIG. 5 shows the composition of the HP making method management table (table 3).

"HP making methods" to be presented are, for example, three kinds of making methods: a logo-only method, a HP designing method, and a HP function preparation method. "Setting cost" denotes the cost of setting of a planned page, which is paid to the manager of the image sharing server 40 at the time of opening the planned page.

The planner receiving the above-described HP making method list in step S106 described above in step S106 in FIG. 2 selects a HP making method reasonable in cost and skill condition (step S107) with reference to the list. Needless to say, the planner may independently (freely) make a home page without using any HP making assistant means provided from the image sharing server 40.

Information on a HP making method selected by the planner is transmitted to the image sharing server 40. The image sharing server 40 calculates, on the basis of the service selected by the planner in step S105 and the HP making method selected in step S107, the cost to be paid to the image sharing server manager by the planner at the time of starting the planned page, and presents the calculated cost as "plan registration fee" to the planner (step S108).

The planner receiving the plan registration fee information sees the cost showed in the information and makes a final decision on whether it will have the plan registered (execution/nonexecution of service development) (step S109). When the planner decides on service development and notifies the image sharing server 40 of the decision result, the image sharing server 40 registers plan information (step S110). That is, the image sharing server 40 registers plan information in a plan management table on the basis of the information on the service to be offered, that the planner transmitted to the image server 40 in step S105. FIG. 6 shows the composition of the plan management table (table 4). Management items and definitions of the same are shown in the table.

After the completion registration of the plan information in step S110 of FIG. 2, the image sharing server 40 transmits to the planner PC 10 data necessary for making a home page (templates, making assistant software, a making procedure manual, and the like, hereinafter referred to as "fundamental HP data") on the basis of the service and the HP making method selected by the planner (step S111).

The planner PC 10 receives the fundamental HP data (step S112), makes an original planned service page on the basis of the received data (step S113), and transmits data on the completed original plan service page (referred to as planning HP data) to the image sharing server 40 (step S114). At this time, planner ID information is attached to the planning HP data.

The image sharing server 40 stores (registers) the planning HP data in the corresponding planner ID folder on the basis of the planner ID information and sets a link from the image sharing server top page to the planned page. Alternatively, the planned page may be set up on a server other than the image sharing server 40.

<Contributor Registration Function>

A contributor registration process will next be described with reference to FIG. 7. The contributor inputs contributor information to the contributor PC 20 and transmits the input information to the image sharing server 40 (step S201). The contributor information includes a contributor's name, an address, a telephone number, an e-mail address, and a money-receiving account number.

The image sharing server 40 receives and registers the contributor information and issues individual identification information for identification of the contributor (contributor ID) on the basis of the contributor information (step S202). FIG. 8 shows the composition of a contributor management table (table 5). "Planner ID" denotes an ID for uniquely identifying each planner. A contributor ID is a unique (nonduplicated) ID issued for each contributor at the time of the above-described contributor ID issuing in step S202 shown in FIG. 7. Management of any of contributed images, the states of secondary use of the contributed images, etc., is performed by using contributor IDs.

In the contributor management table, the information items input to the contributor PC 20 at the time of the above-described contributor information transmission in step S201 shown in FIG. 7 are respectively stored as management items: "contributor's name", "address", "telephone number", "e-mail address", and "money-receiving account number".

Subsequently to step S202 shown in FIG. 7, a contributor ID folder is formed in the image sharing server 40. The contributor ID folder is a folder for management of images contributed by the contributor. The contributor ID folder is formed in the image sharing server 40 simultaneously with contributor registration and contributor ID issuing. When the contributor contributes an image to any of various planned services, the image is stored in the corresponding contributor ID folder.

After the formation of the planner ID folder, the image sharing server 40 notifies the contributor of the contributor ID (step S204). The contributor PC 20 receives the notified contributor ID from the image sharing server 40 (step S205), thereby terminating the contributor registration process.

<Contributed Image Management Function>

A contributed image management process will be described with reference to FIG. 9. The contributor inputs, for its authentication by the image sharing server, the contributor ID obtained at the time of contributor registration (step S301) and transmits the input ID to the image sharing server 40. The image sharing server 40 performs authentication of the contributor by collating the contributor ID transmitted from the contributor with the contributor management table (see FIG. 8) (step S302). After identifying the contributor as a registered contributor, the image sharing server 40 prepares a planned service list on the basis of the plan management table (FIG. 6) and transmits this list to the contributor (step S303). The planned service list includes planner IDs, kinds of service, contributor return rates, and other sorts of information.

The contributor selects a plan according to its preference by referring to the plan service list (step S304). Then the contributor selects an image to be contributed (step S305), inputs information on attributes of the image to be contributed (a title and supplementary information such as a comment) (step S306), and makes a setting as to whether its contribution image will be released in a pay service offered through the planned page (step S307). The pay service is, for example, on-order printing or data downloading.

After the completion of input of the contribution image and the necessary information accompanying the image in steps S304 to S307, the contributor transmits the contribution image and the information accompanying the image (hereinafter referred to as contributed image information) to the image sharing service 40. The contributed image information includes a contributor's name, a planner ID, the contributed image, the image attribute information, and mailing service offer/non-offer information.

The image sharing server 40 stores in the contributor ID folder the contributed image sent from the contributor and registers certain sorts of information in a contributed image management table (step S309). FIG. 10 shows the composition of the contributed image management table (table 6).

A management item "image ID" is a unique ID attached to each contributed image. As an item "planner ID", the planner ID related to the plan selected by the contributor is stored. As "contributor ID", the ID of the contributor is stored. As "image location", the address of a place in which the contributed image is stored is stored. As "attribute information", the attribute information input in step S306 is stored. As an item "pay service offer/non-offer", the information set in step S307, i.e., information as to whether the contributed image will be offered as an object of a pay service. After the completion of the above-described registration of the contributed image, the contributed image can be released through the planned page.

<Pay Service Management Function>

The pay service management function will be described with respect to on-order printing by way of example. FIG. 11 shows a pay service management process. When a service user accesses the image sharing server 40 through the Internet 60, the image sharing server 40 draws up a planned service list for the service user on the basis of the plan management table (FIG. 6) and transmits the list to the service user (step S401). The planned service list contains information on planner IDs, kinds of service (details) and service prices.

The service user selects, by referring to the planned service list, one of the planned services he or she wishes to use (step S402). When the service user makes this selection, a jump is made to the selected planned page. The user selects an image which he or she wants to obtain by making an order for printing of the image (step S403), and inputs a print size and a number of prints (step S404). A plurality of images can be selected in one order. The print size can be selected from DSC size (89×119 mm), L size (89×127 mm), etc.

Next, the service user inputs print delivery destination information designating a place where the print is to be received, and also inputs information for settlement (e.g., a credit card number) (step S405). After completing input of the necessary information and determining the printing order, the user transmits printing order information to the image sharing server 40 (step S406). The print ordering order information includes an ID for the image to be printed (an ordered image number), the kind of print (an ordered image number), the number of prints (ordered image numbers), receiving information (a delivery destination address, a telephone number, a name, etc.), and a credit card number for settlement.

The image sharing server 40 receives the printing order information (step S407), and registers the order information in an order management table and a settlement management table. FIG. 12 shows the composition of the order management table (table 7), and FIG. 13 shows the composition of the settlement management table (table 8). Management items and definitions or details of the same are shown in each of FIGS. 12 and 13.

After registering the print order information in step S408 shown in FIG. 11, the image sharing server 40 executes printing with the printer 50 on the basis of the print order information sent from the user (step S409). After the completion of printing operations designated by the details of the order, the item "processing state" in the settlement management table (FIG. 13) is changed to "ordered processing completed".

Thereafter, the image sharing server 40 performs processing for sending the print to the delivery destination address contained in the print order information from the user and also performs processing for settlement of a charge for the order using the credit card number in the print order information (step S410). After the completion of settlement, the item "processing state" in the settlement management table (FIG. 13) is changed to "settlement completed".

<Service Use Instance Totalization/Management Function>

The service use instance totalization/management function will be described. The image sharing server 40 periodically (e.g., once a month) totalizes instances of use of the service with respect to each planner and computes the amount of money to be returned to the planner. That is, the image sharing server 40 totalizes instances of use of contributed images with respect to each planner ID on the basis of the contributed image table (FIG. 10) and the planner management table (FIG. 1). Results (1) of this totalization include the planner ID, the planner organization name, the planner contact place (telephone number, e-mail address), the number of contributes who contributed images to the planner, and the number of images contributed to the planner.

The image sharing server 40 also totalizes pay service orders with respect to each planner in a certain period on the basis of the order management table (FIG. 12), the settlement management table (FIG. 13) and the planner management table (FIG. 1). Results (2) of this totalization include the totalization period, the planner ID, the planner organization's name, the planner contact place (telephone number, e-mail address), and pay service order information (the number of orders). The pay service order information includes detailed information items: the kinds of order, image IDs, the number of orders, and order prices.

The planner is periodically notified of results (1) of totalization of instances of use of contributed images and results (2) of totalization of pay service orders described above.

To compute the amount of money to be returned to each planner, amounts of money determined in the predetermined period to be returned are totalized on the basis of the order management table (FIG. 12), the contributed image management table (FIG. 10), the plan management table (FIG. 6) and the planner management table (FIG. 1). Totalization results (3) include information such as the totalization period, the planner ID, the planner organization name, the planner contact place (telephone number, e-mail address), the money-receiving account number, the total amount of money for pay services, and total amount to be returned to planners.

Each planner is periodically notified of totalization results (3) relating to the amount of money to be returned to the planner. The image sharing server manager pays into the planner's account the amount of money to be returned to the planner, which is designated in totalization results (3). After payment, the item "processing state" in the settlement management table (FIG. 13) related to the corresponding order ID is changed to "return to planner completed".

Totalization of service use instances and amounts of money to be returned to each contributor is also performed. That is, the image sharing server 40 totalizes pay service orders in a certain period with respect to each contributor on the basis of the order management table (FIG. 12), the contributed image management table (FIG. 10) and the contributor management table (FIG. 8). Results (4) of this totalization include the totalization period, the contributor ID, the contributor's name, the contributor contact place (telephone number, e-mail address), and pay service order information (the number of orders). The pay service order information includes detailed information items: the kinds of order, image IDs, the number of orders, and order prices. The contributor is periodically notified of results (4) of the above-described totalization of instances of use of services with respect to each contributor.

To compute the amount of money to be returned to each contributor, amounts of money determined in the predetermined period to be returned are totalized on the basis of the order management table (FIG. 12), the contributed image management table (FIG. 10), the contributor management table (FIG. 8) and the plan management table (FIG. 6). Totalization results (5) include information such as the totalization period, the contributor ID, the contributor's name, the contributor contact place (telephone number, e-mail address), the money-receiving account number, the total amount of money for pay services, and the total amount of contributors.

Each contributor is periodically notified of totalization results (5) relating to the amount of money to be returned to the contributor. The image sharing server manager pays into the contributor's account the amount of money to be returned to the contributor, which is designated in totalization results (5). After payment, the item "processing state" in the settlement management table (FIG. 13) related to the corresponding order ID is changed to "return to contributor completed".

In the first embodiment, each planner can easily open its original planned page by accessing the home page (image sharing server TOP page) held by the image sharing server manager and by fulfilling registration requirements. When making a planned page, the planner can be supplied with making assistant templates from the image sharing server to lighten the load of making the page.

Each contributor can obtain a list of registered plans by accessing the home page of the image sharing server manager to find a planned page which accords with its interest. When the contributor only contributes an image for sale to the selected planned page, the contributed image is exhibited on the planned page and treated as an article of trade on the same.

A service user can obtain a list of registered plans by accessing the home page of the image sharing server manager to find a planned page which accords with his or her preference. The user makes an order by designating some of the images exhibited on the selected planned page, which he or she wishes to purchase, and a service form in which the image is purchased.

Since order processing, delivery of images and settlement are performed by the image sharing server manager, users can use services without worrying about them. The amount of money collected at the image sharing server manager as charges for offer of each service is distributed to both the planner and the contributor on the basis of contracted return rate (return setting at the time of registration). Therefore it is possible for the planner or contributor to obtain a proper return according to sales without being required to perform burdensome operations for order processing, delivery of images, settlement, etc.

The image sharing server manager holds printer 50 or makes a contract with an owner of printer 50 to make a profit by printing. The image sharing server manager can secure a profit by collecting registration fees each charged at the time of opening (registration) of a planned service page and by collecting planned page maintenance costs periodically (once a year, for example). Also, the image sharing server TOP page, which is a window for acceptance of contributions and requests for services, is used as an advertising medium make a profit apportioned to the image sharing server manager. The server manager can also open a planned page by itself to offer images for sale.

While the first embodiment of the present invention has been described with respect to trade of images by way of example, data treated as an article of trade comprises not only still images but also moving images, pieces of music (sounds), computer programs, etc.

A preferred embodiment of an information service offering system and an information release service assistance method in accordance with the present invention will be described below in detail with reference to the accompanying drawings.

Figure 14:
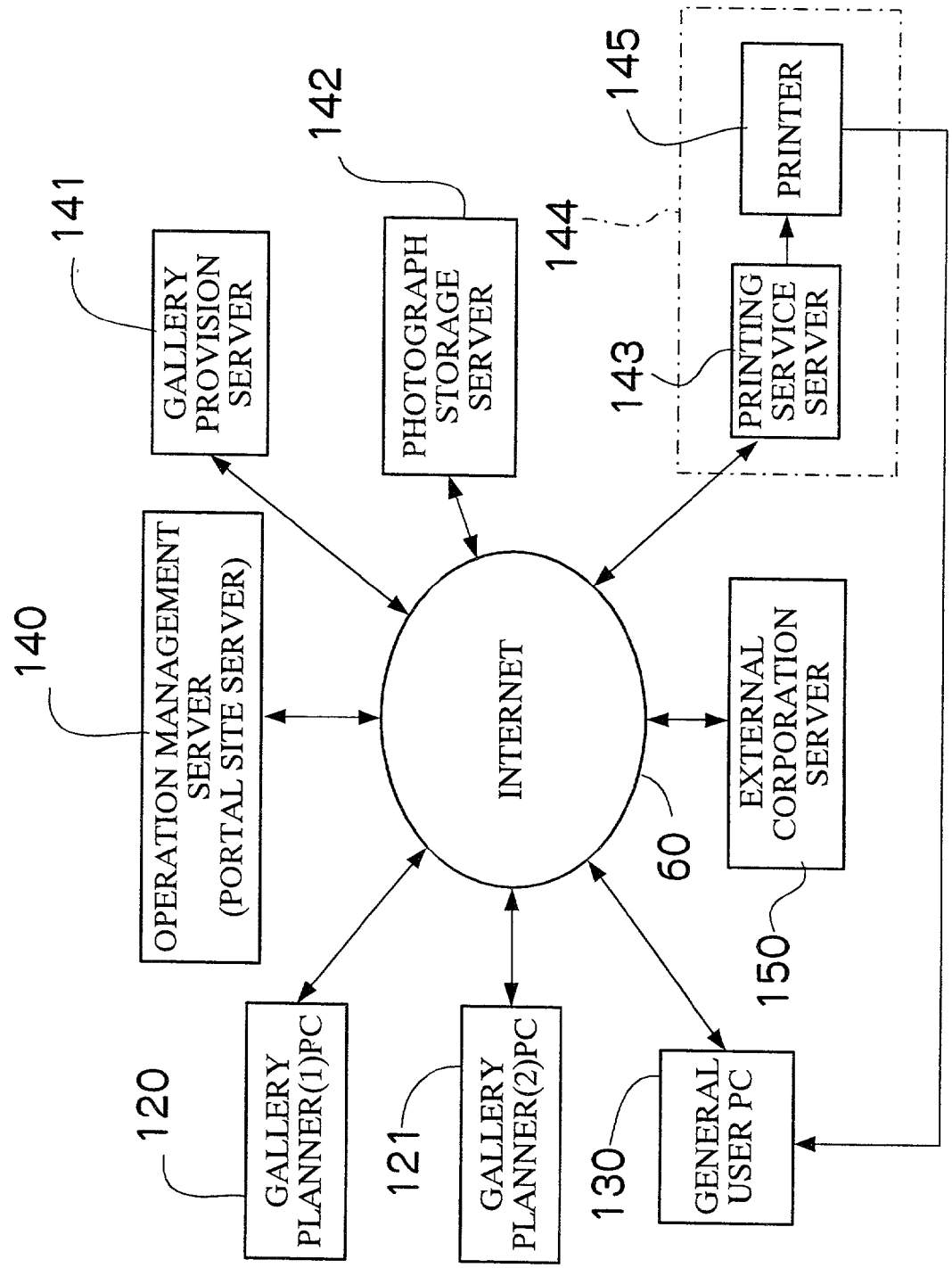
FIG. 14 is a diagram showing the configuration of a system which represents a second embodiment of the present invention.

FIG. 14 is a diagram showing the configuration of a system which represents a second embodiment of the present invention. A plurality of client computers 120, 121 for planners each planning opening of a gallery site (hereinafter referred to as "planner PC") and client computers 130 for general users who will read information on gallery sites (hereinafter referred to as "user PC") are connected to a wide-area network 60, e.g., the Internet. Although only one block representing a user computer is shown in FIG. 14, a plurality of service users actually exist. To the network 60 are also connected to a server 140 for centralized control of service operations (hereinafter referred to as "operation management server"), a gallery provision server 141, a photograph storage server 142, and a printing service server 143. A service provider 144 which controls the printing service server 143 has a printer 145 and conducts operations for carrying out photographic printing in accordance with an order from a user and delivering a print to the orderer, i.e., the user.

A manager who manages service operations in this system (hereinafter referred to as "operation manager") manages service operations by preparing the operation management server 140, the gallery provision server 141, the photograph storage server 142, and the printing service provider 144. Needless to say, the managing corporation need not hold all these servers and provider by itself and may realize the system by tying up with other corporations. A server 150 outside the domain under the control of the operation manager (hereinafter referred to as external corporation's server) may also be connected to the network 60. A gallery planner who opens independent gallery site on the external corporation's server 150 may exist.

Next, details of services carried out by the thus-arranged system will now be described. Services offered in the system of this embodiment include three main services: (1) internet printing service, (2) internet galley service, and (3) advertisement provision service.

<Internet Printing Service>

Figure 15:
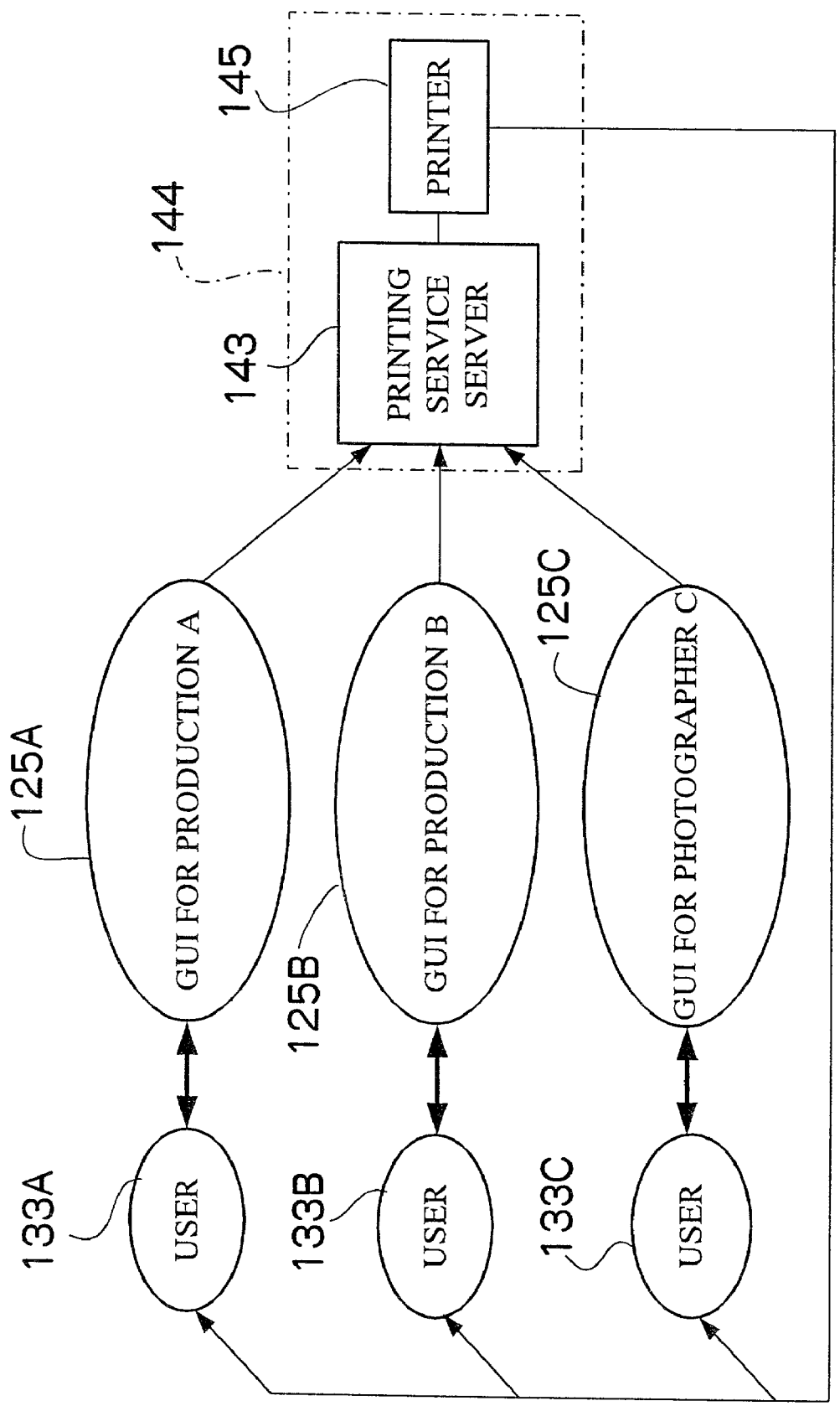
FIG. 15 is a diagram showing an arrangement for an internet printing service in the second embodiment of the present invention.

The internet printing service is a service which accepts photograph printing orders on the Internet. FIG. 15 shows the configuration of an internet printing service system. Services which accept printing orders on the Internet have already been developed on home pages held by photostudios and camera makers.

In conventional printing service sites, however, graphical user interfaces (GUI), e.g., an on-screen interface for selection (designation) from images to be printed and an on-screen interface for designation of the print size, the number of prints, etc., are fixed and uniformized. Also, a printing service provider (who carries out a service to perform printing and deliver a print to an orderer) is combined with a service site provider or ties up with service site provider under a certain contract to form a substantially one business entity. Therefore the printing service provider cannot widely accept printing orders through the network. Such a relationship is a hindrance for utilization of printing equipment including a printer.

In the system of this embodiment, by considering these circumstances, a printing service plan provider (who, hereinafter referred to as "contents provider", plans a printing service and opens a planned page) and a printing service provider (who, hereinafter referred to "service provider", actually undertakes and carries out printing operations) are separate from each other. In the example shown in FIG. 15, a production A, a production B and a photographer C are shown as contents providers. The production A, the production B and the photographer C respective open home pages (hereinafter referred to as "planned page") 125A, 125B, and 125C, exhibits on the planned pages photographs held by themselves or contributed images, and perform service operations for selling them. The planned pages 125A, 125B, and 125C of the planners may be respectively constructed on independent servers or may be provided by using the galley provision server 141 or the photograph storage server 142 prepared by the operation manager who manages this system, as described below.

The service provider 144 having the printing service server 143 makes contracts for printing operations with a plurality of contents providers who plan printing services, and actually perform printing operations in accordance with orders accepted through the planned pages 125A, 125B, and 125C of the contents providers. Prints thereby finished are delivered by delivery methods (sending by mail, over-the-counter delivery, etc.) prescribed in the contracts to users 133A, 133B, 133C . . . who are the orderers.

In this manner, the service provider 144 can accept orders from a multiplicity of customers, so that the availability of the printer 145 is improved. Also, the service provider 144 has no need for preparing a home page (GUI) for independently accepting printing orders and may only accept orders transmitted from the planned pages 125A, 125B, and 125C of the contents providers, execute the orders, deliver prints (articles of trade) and perform a charge collecting operation.

Therefore each contents provider can individually prepare a GUI for accepting orders, thus satisfying various needs of users.

Referring to FIG. 15, users 133A, 133B, 133C . . . access the planned pages 125A, 125B, 125C according to their needs by using the user PC 130 described above with reference to FIG. 14 or other communication terminals, view photographs on the pages, and select images which they wish to purchase (print). In ordering a print, each user designates print form details, such as a print size, a glossy or matte finish, a bordered or borderless finish, a calendar, a postcard or a seal print form, and a desired number of prints. Such print order information input by the users 133A, 133B, 133C . . . is sent via the planned pages 125A, 125B, 125C or directly to the printing service server 143 without the intermediary of the planned pages 125A, 125B, 125C.

Information transmitted for this ordering includes planner information for identification of the planned pages 125A, 125B, 125C through which the orders have been accepted, information for identification of the images to be printed, order information on the designated print size, the designated number of prints, etc., information on addresses to which the prints are to be delivered (delivery methods), and information on the prices of the photographs. The contents provider can freely determine the price of each photograph according to the features (value) of the photograph. The prices of the photographs and other sorts of information are delivered in a unified format, e.g., the Extensible Markup Language (XML) file format to the printing service server 143. Also, image data for the objects to be printed is set from the data base (not shown in FIG. 5) to the printing service server 143.

The service provider 144 executes printing in accordance with the received orders to produce prints and sends the obtained prints and bills to the users 133A, 133B, 133C (or shops or the like selected as delivery destinations). On each bill, an account number (transfer-destination account number) for payment to the corresponding contents provider is written. The users 133A, 133B, 133C pay the necessary amounts of money into the designated accounts to enable the contents providers to receive the amounts of money corresponding to the selling prices. Alternatively, the bill may be sent before delivery of the print or may be issued on-line at the time of acceptance of the printing order and the print may be delivered upon confirming the receipt of money.

The charge for printing by the service provider 144 that has performed printing operations is determined according to the print style and the number of prints irrespective of the value of the images. Therefore the service provider 144 can secure a profit by charging each contents provider for the cost determined by the print style and the number of prints. Each contents provider can obtain as a profit the amount determined by subtracting the charge to be paid to the service provider 144 from the selling price of the photograph. Settlement using a credit card may be performed instead of the above-described settlement using a bill. A request for inputting a credit card number may be made at the time of acceptance of a printing order. In the case where the print for some of the users is directly delivered to the user at a shop, cash settlement at the time of delivery is possible.

Contents providers including production A, production B and photographer C have no need to individually hold printing equipment and can easily develop the printing business. The service provider 144 holding facilities can expect a substantial increase in the number of users if it makes contracts with a multiplicity of contents providers, thus enabling efficient use of printing facilities.

<Internet Gallery Service>p The internet gallery service is provided to assist a content provider in opening a gallery on the Internet. The internet gallery service is constituted by four service menu items: <1> a portal site service, <2> a gallery provision service, <3> photograph storage service, and <4> GUI component provision service.

The portal site service is used to provide a home page (portal site) which serves as a window which an internet user first accesses in search for information. Gallery sites are registered in a portal site and links to the gallery sites are set, thereby enabling a user to easily locate a galley site which the user wants to access.

The gallery provision service is used to provide a server (gallery provision server 141), a GUI, etc., for enabling a content provider to open a gallery on the Internet. The photograph storage service is used to provide a disk space for storing photograph data for opening a gallery. The GUI component provision service is used to provide and sell GUI components for constructing a gallery and for making an on-screen interface for ordering photographs.

Figure 16:
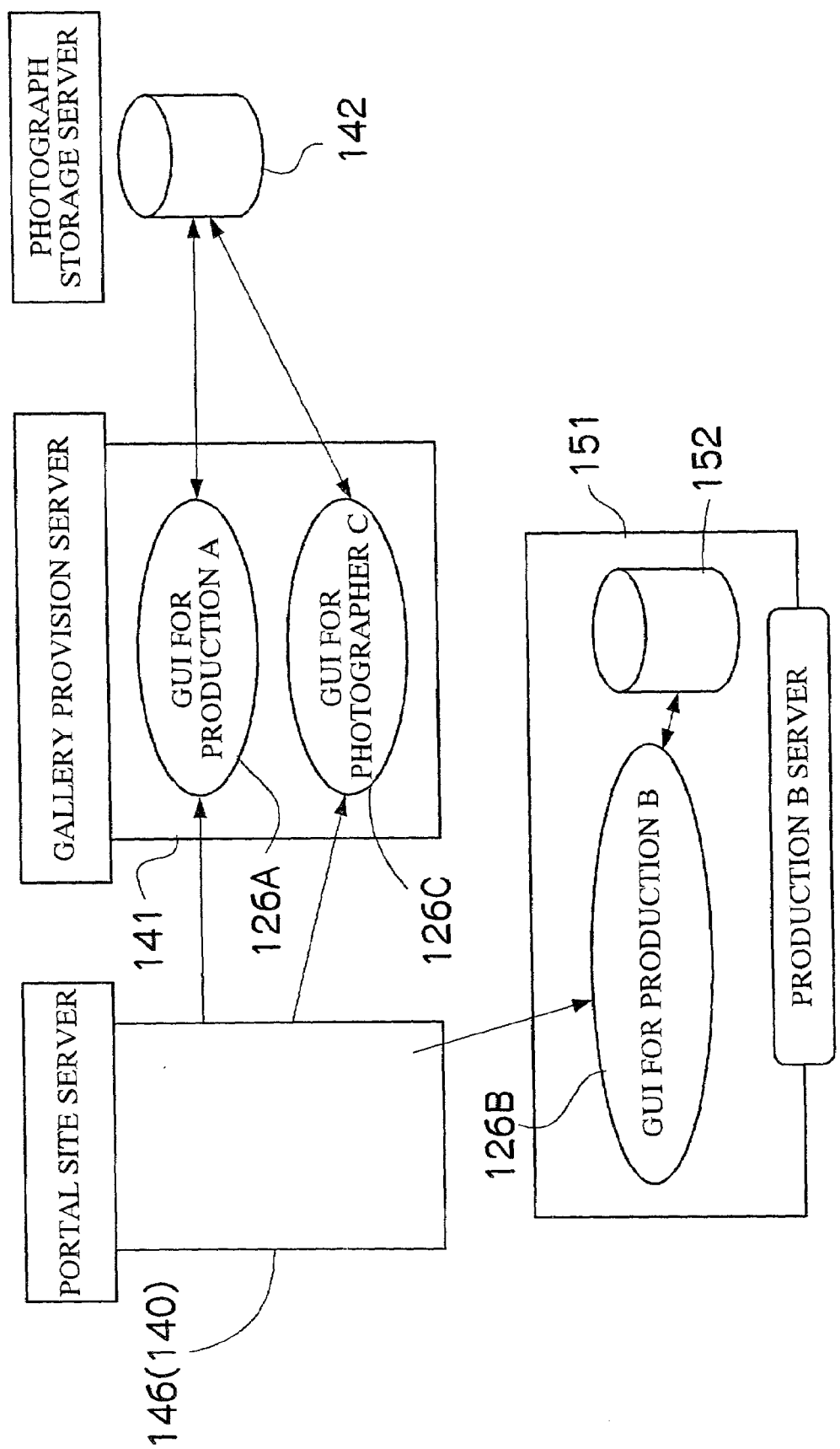
FIG. 16 is a diagram showing an arrangement for an internet gallery service in the second embodiment of the present invention.

FIG. 16 is a diagram showing the configuration of an internet gallery service system. In the example illustrated in FIG. 16, a manager who operates the service system (hereinafter referred to as "operation manager") prepares a portal site server 146 (corresponding to the operation management server 140 shown in FIG. 14), a gallery provision server 141 and a photograph storage server 142. The operation manager may be an enterprise, an individual or an enterprise group comprising a plurality of enterprises.

"Production A" and "photographer C" are under contract with the operation manager for use of the gallery provision service and the photograph storage service. "Production A" and "photographer C" respectively open planned pages for exhibition of images (hereinafter referred to as "gallery page") 126A and 126C on the gallery provision server 141, release various photographs through the gallery pages 126A and 126C, and accept contributed images from users, etc. The contents providers can freely make gallery pages 126A and 126C. However, the contents providers can be provided with making assistant tools such as templates for making pages and GUI components from the operation manager if necessary.

Image data to be exhibited on the gallery pages 126A and 126C, i.e., image data uploaded by the contents providers to be released and image data contributed by general users are stored in the photograph storage server 142.

"Production B" holds its own server 151 and constructs a gallery page 126B on a server 151. "Production B" is under contract with the operation manager only for use of the portal site service.

Modes of use of the internet gallery service system shown in FIG. 16 will next be described. "Production A" having no server of its own makes a contract with the operation manager for use of the gallery provision service and the photograph storage service with the intention of exhibiting (if necessary, selling), on the Internet, pictures of talents and musicians under the management of the production A. In the contract, a period may be fixed use during which the production A can use the service. For example, a newspaper publishing company or the like may utilize this system as a means for opening a gallery for exhibition of news photos.

The production A opens the gallery page 126A for itself on the gallery provision server 141 and registers images to be released (at least one image) in the photograph storage server 142. For making of the page for the production A, making assistant means such as GUI components and templates necessary for making the page are provided from the system manager side. The production A can easily make its own page by using the making assistant means. Needless to say, it may independently make its page without using the making assistant means.

Similarly, "photographer C" makes a contract with the operation manager for use of the gallery provision service and the photograph storage service with the intention of exhibiting and selling photographs that the photographer is holding. The photographer C opens the gallery page 126C for him/herself on the gallery provision server 141 and registers images to be released (at least one image) in the photograph storage server 142. The photographer C is provided with GUI components, templates, etc., for assisting the photographer in making its page, as is the production A.

Those under the contract for the gallery provision service are additionally offered the portal site service. The production A's gallery site and the photographer C's gallery site opened on the gallery provision server 141 are registered in a gallery list on the portal site server 146 to set links from the portal site to the gallery sites.

"Production B" operates its own server 151, opens the gallery page 126B on the server 151, and stores in a data base 152 image data to be released. "Production B" is under the contract for use of the portal site service, and a link to the gallery page 126B of the production B is registered in the gallery list on the portal site server 146.

An ordinary user (who views photographs on the Internet and uses the printing service, etc.) first accesses the portal site and searches for a gallery site according to his or her need by using a search service available at the site. A jump from the portal site to the desired gallery site is made to enable the user to view images on the gallery.

An advertisement provision service may be added to the system shown in FIG. 16. The advertisement provision service is used to provide various regions for advertisement. For example, menu items such as a portal site advertisement service and an uploader advertisement service are conceivable.

The portal site advertisement service is used to provide an advertisement space for pay in the portal site. The uploader advertisement service is used to distribute an icon for advertisement to windows formed by application software for uploading of image data from personal computers (PC) used in homes to the server on the network. This application software is a program for realizing an image browsing function and an uploading function for transmitting an image selected from a on-screen image display to a designated server over the Internet by using a computer, i.e., an image viewer capable of enabling, on one window, browsing of images and input of an instruction to upload a selected image.

Figure 17:
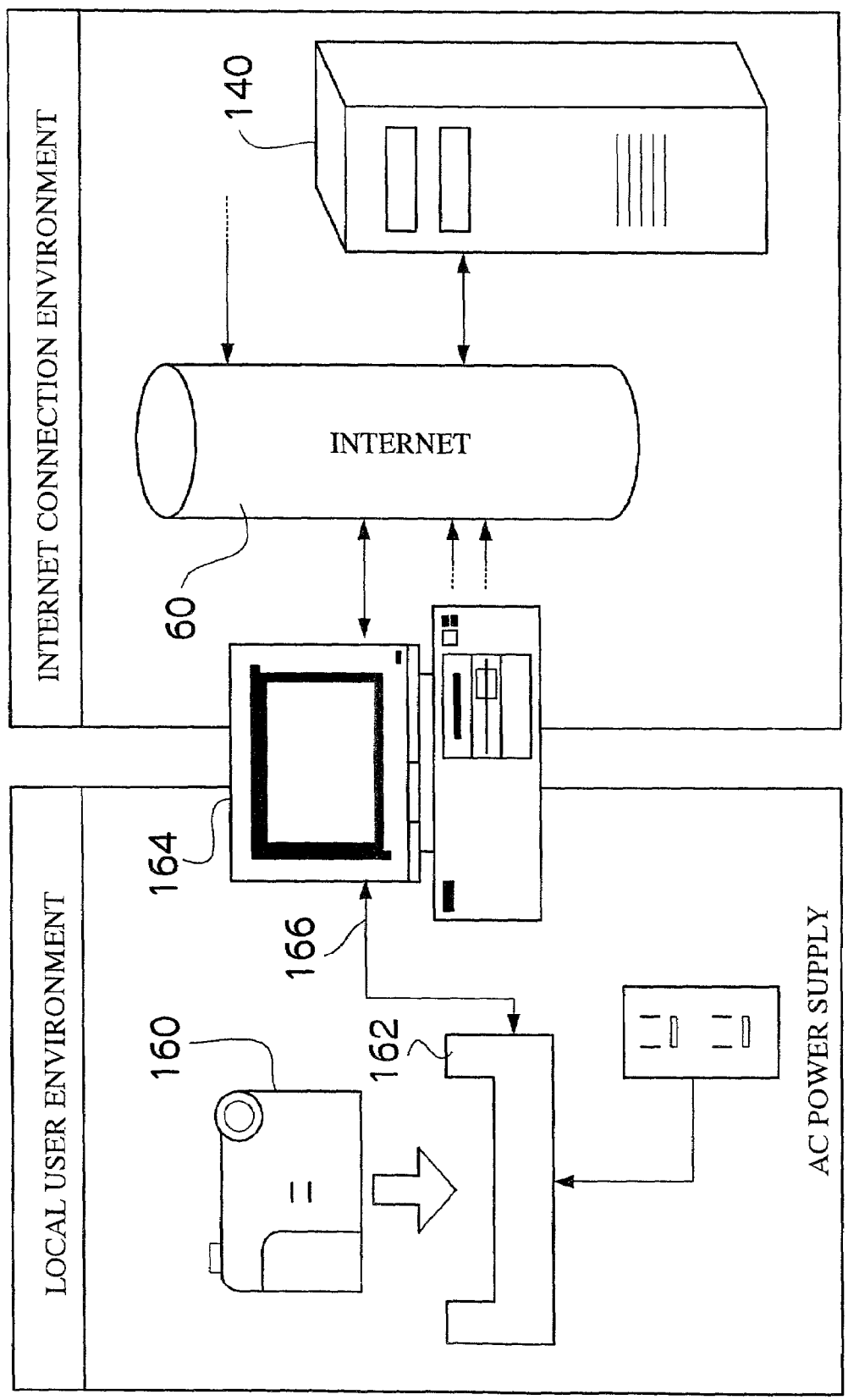
FIG. 17 is a diagram showing the configuration of a system and a connection form in which a user transmits an image to the server by using an image viewer.
Figure 18:
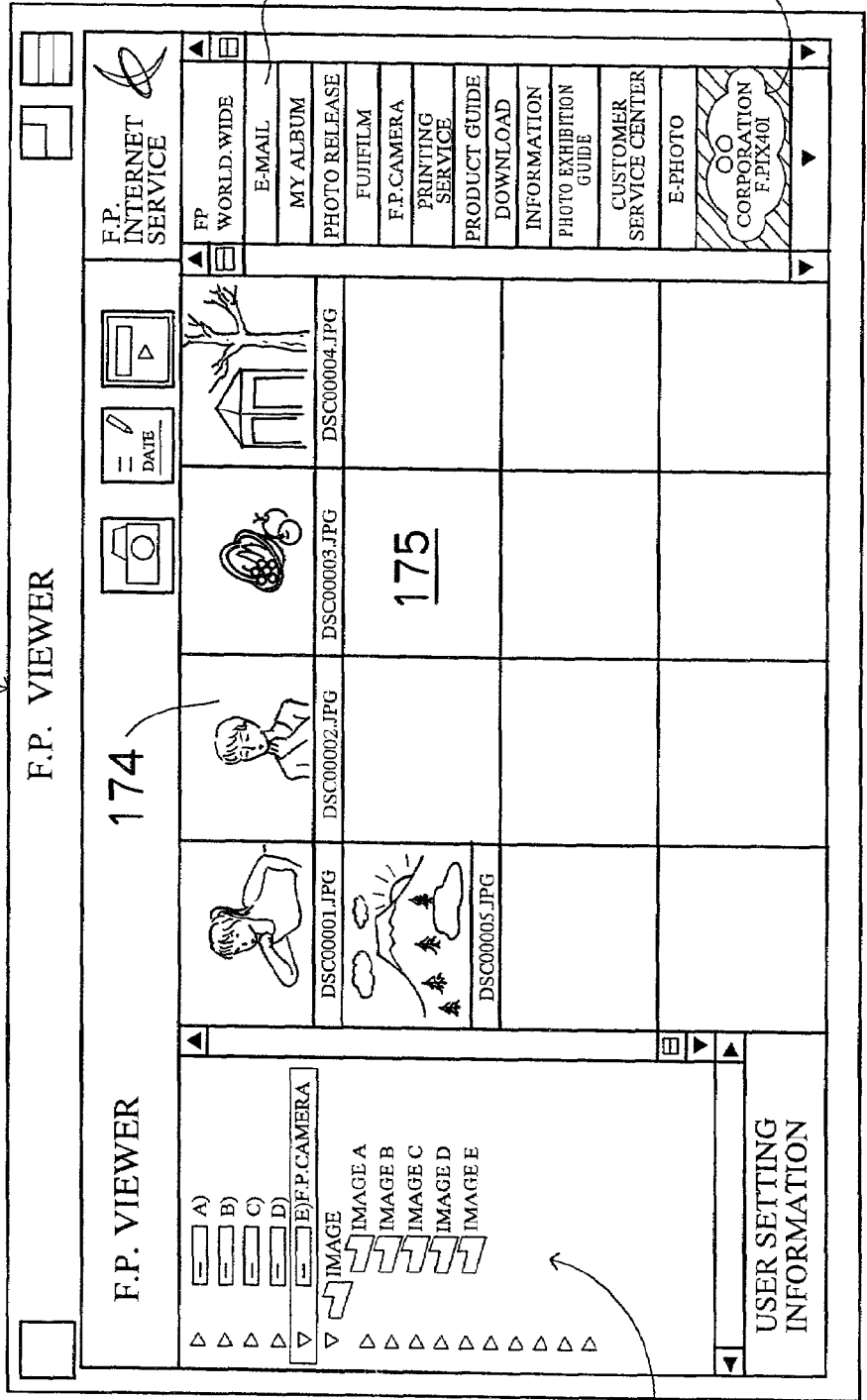
FIG. 18 is a diagram showing an example of an on-screen interface of the image viewer.

FIG. 17 is a diagram showing the configuration of a system using such an image viewer. FIG. 18 shows an example of an on-screen interface of the image viewer (image browsing software). Referring to FIG. 17, when an electronic camera 160 is inserted in a cradle 162, a personal computer 164 automatically detects the connection of the electronic camera 160 through a communication means 166 such as a universal serial bus (USB) (using the Plug and Play function) to automatically start an image viewer 170 which is a piece of application software for displaying a list of images in the electronic camera 160.

When the image viewer 170 is started, the personal computer 164 accesses the operation management server 140 through the Internet 60 to obtain information such as a service menu containing various available services registered in the server 140. On the basis of the obtained information including the service menu, various icons (menu buttons) 171, banner advertisements 172, etc., are displayed in the window of the image viewer 170. The operation management server 140 manages personal information about users of electronic cameras 160 and personal computers 164 to provide a menu and advertisements customized for each user.

As shown in FIG. 18, the window of the image viewer 170 has file list display section 173 for displaying a folder structure, an image list display section 175 for displaying a list of images (thumbnail images) 174 formed by scaling down images stored in a folder designated by the user, and a menu display section 176 for displaying a list of menu buttons 171 relating to various services. A portion of the menu display section 176 is also used as an advertisement display section where a banner advertisement 172 distributed by the advertisement service is displayed.

Each menu button 171 is a link button for connection to a server of a service provider who is offering services. For example, menu buttons 171 include service selection buttons such as a printing service button, a photo CD making service button, a photograph exhibition button, a photo contest contribution button, an auction site transmission button, and a portable telephone display button.

The user selects one or a plurality of images according to his or her need from file names displayed in the file list display section 173 or from the list of scaled-down images 174 displayed in the image list display section 175 only by using an input means, typically a pointing device such as a mouse, or a keyboard, and clicks the desired one of menu buttons 171. The user can transmit information necessary for a printing service order, including image data, and can upload an image file and an audio file for use in a photo CD making service or a photograph exhibition service on the Internet or for contribution to a photo contest only by performing the above-described operations.

Figure 19:
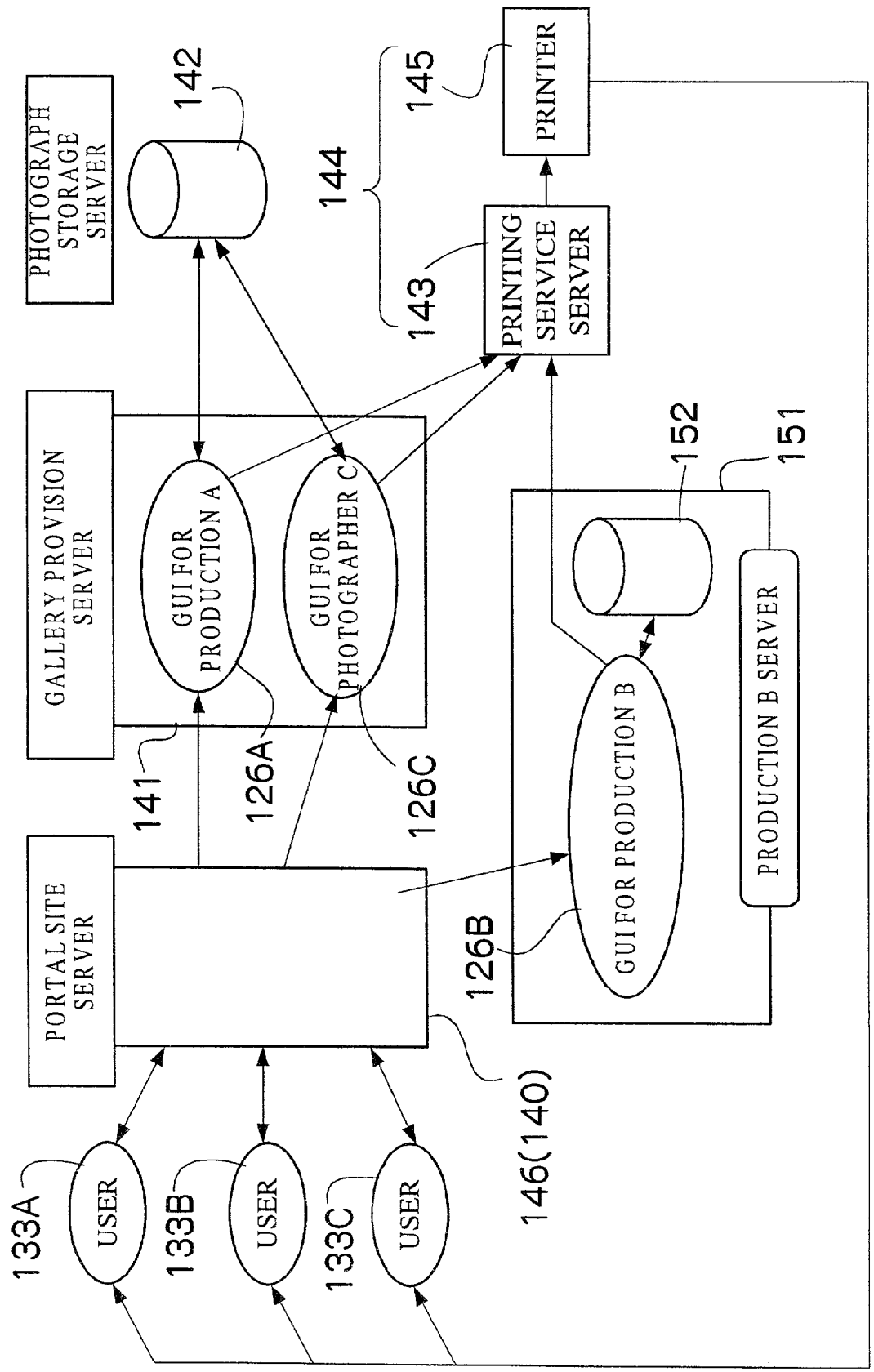
FIG. 19 is a diagram of showing an arrangement for an internet gallery provision service in the second embodiment.

The cooperation of the gallery provision service and the printing service will next be described. FIG. 19 shows the configuration of a relating service system. Users 133A, 133B, 133C . . . access the portal site server 146 through the network 60 and browse pages on the portal site. After jumping from the portal site page to the desired gallery page 126A, 126B or 126C, each user views images exhibited in the gallery.

The user selects some of the images in the gallery which the user wishes to obtain, inputs data on designation of a print style and the number of prints. This order data is sent to the printing service server 143. The service provider 144 executes printing in accordance with the received order. Prints thus obtained are provided to users 133A, 133B, and 133C. For settlement of charges for printing, the same settlement method as that described above with reference to FIG. 15 is used.

The second embodiment of the present invention has been described with respect to a printing service selected a mode of outputting images. However, any image selling methods other than that for selling printed images may be used. For example, recording mediums, e.g., a compact disc-recordable on which electronic image data is recorded may be sold and a mode of providing means for downloading data for pay is conceivable. Data treated as an article of trade is not limited to still image data. Any other electronic data on moving images, audios, pieces of music, books (documents), computer programs, etc., may be treated as an article of trade.

According to the present invention, as described above, an image sharing server and service execution device are prepared; registration of plans on the information sharing server is invited; a service comprising collecting information from various contributors through a registered page planned by a planner and providing the contributed information for pay is developed; and portions of a profit obtained by this service are respectively returned to the planner and contributors. Therefore it is possible for the planner or contributor to obtain a proper return without being required to perform burdensome operations for execution of the service and collecting money. Thus, the present invention provides a useful field for activity to venture entrepreneurs, etc., concerned with the Internet.

According to the present invention, finely divided functions and services for exhibiting and selling images and other contents on the network are provided, thereby assisting contents providers in constructing planned pages by themselves. Thus, the process of developing contents provision business on the Internet is made easier.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An information service offering system for realizing a service to receive information from contributors through a network and to offer the contributed information to a third party for pay, the information service offering system comprising:

communication units for contributors;
communication units for planners who plan services;
communication units for service users who will purchase contributed information;
an information sharing server; and
a service execution device which executes provision of information to a service user on the basis of a request from the service user, wherein:

the communication units for the contributors, the communication units for the planners, the communication units for the service users and the information sharing server are communicably connected to each other through a network;

the information sharing server comprises:
a plan registration device which registers information about each of the planners at a request from the planner;
a plan exhibition device which shows planned pages opened by the planners to the service users;
a contributor management device which manages the contributors who contribute information to the planned pages;
a contributed information management device which manages the information contributed by the contributors;
a service management device which accepts orders from the service users and manages in accordance with each order the corresponding service executed by the service execution device;
a profit management device which manages a profit obtained as a charge for use of each service;
a service use instance totalization device which totalizes instances of use of the service registered on the information sharing server and developed by each planner and instances of use of the contributed information with respect to each planner and with respect to each contributor; and a profit return amount computation device which computes, on the basis of the results of totalization obtained by the service user instance totalization device, an amount of money to be returned to each planner and an amount of money to be returned to each contributor as portions of a profit made by setting the contributed information;

each of the communication units for the planners includes a device which transmits, to the information sharing server, data for application of registration of each planned page and the corresponding planner information in the information sharing server;

each of the communication units for the contributors includes a device which transmits, to the information sharing server, contributed information treated as an object to be offered for pay and corresponding contributor information; and each of the communication units for the service users includes a device which transmits order data for purchasing desired contributed information by accessing the corresponding planned page opened by the planner.

2. The information service offering system according to claim 1, wherein:

the planned page of each planner is opened on the information sharing server; and the information sharing server provides planned page making assistant device which assists the planner in constructing the planned page on the information sharing server.

3. The information service offering system according to claim 1, wherein:

a contract relating to the amount of money to be returned is made at the time of planner registration and at the time of contributor registration; and the amount to be returned is computed in accordance with the contract.

4. The information service offering system according to claim 1, wherein the information sharing server further comprises a device which periodically notifies each planner and each contributor of the results of totalization obtained by the service use instance totalization device.

5. An information service offering method in which a planner is assisted in realizing a service when the planner develops the service by receiving information from contributors through a network and by selling the contributed information to a third party, the method comprising the steps of:

preparing an information sharing server and a service execution device which actually offers a service user some of services planned by planners and registered in the information sharing server, and inviting registration of plans in the information sharing server;

registering information about each planner planning a service on the information sharing server at a request from the planner;

opening a planned page for development of the service planned by the planner;

accepting contribution of information from contributors through the planned page;

registering information about each contributor on the information sharing server;

storing and managing the information contributed by the contributors;

accepting an information purchase order from a service user through the planned page;

executing the service to provide, by the service execution device, the contributed information designated by the order from the service user;

performing settlement of a charge for the service offered to the service user;

totalizing instances of use of the service registered and developed by each planner and instances of use of contributed information with respect to each planner and with respect to each contributor;

computing, on the basis of the results of totalization in the totalization step, an amount of money to be returned to each planner and an amount of money to be returned to each contributor as portions of a profit made by the service of providing the contributed information; and returning portions of the profit to each planner and each contributor according to the results of computation in the computation step.

6. An information sharing server, comprising:

a plan registration device which registers information about each of planners at a request from the planner, the planner planning to develop a service by accepting information from contributors through a network and by selling the contributed information to a third party;

a plan exhibition device which shows planned pages opened by the planners to the service users;

a contributor management device which manages the contributors who contribute information to the planned pages;

a contributed information management device which manages the information contributed by the contributors;

a service management device which accepts orders from the service users via a network and manages in accordance with each order the corresponding service executed by a service execution device;

a profit management device which manages a profit obtained as a charge for use of each service;

a service use instance totalization device which totalizes instances of use of the service registered on the information sharing server and developed by each planner and instances of use of the contributed information with respect to each planner and with respect to each contributor;

a profit return amount computation device which computes, on the basis of the results of totalization obtained by the service user instance totalization device, an amount of money to be returned to each planner and an amount of money to be returned to each contributor as portions of a profit made by selling the contributed information; and a use instance notification device which periodically notifies each planner and each contributor of the results of totalization obtained by the service use instance totalization device.

7. An information service offering system for realizing a service to offer information to a third party by means of a network, the information service offering system comprising:

at least one planned page opening server which enables each of a plurality of contents providers planning information offering services to exhibit, on the network, including offering fee-based digital data, and enables each of the plurality of contents providers to individually open a home page for accepting purchase order information from users;

a data storage device which stores the fee-based digital data;

a communication unit which accesses the home page through the network to enable reading of the fee-based digital data, input of an order, and transmission of purchase order information; and a service execution device which executes a service by operating associably with home pages opened by the plurality of contents providers to perform centralized management of orders accepted through the home pages, by converting the purchase order information into a predetermined form in accordance with the order, wherein the service execution device facilitates the processing of the order.

8. The information service offering system according to claim 7, wherein:

purchase order information accepted from the user on each home page is converted into order data in a common format; and the order data in conformity with the common format is sent to the service execution device.

9. The information service offering system according to claim 7, wherein:

the cost of provision of information to the user for pay is determined by each of the plurality of contents providers according to the contents of the fee-based digital data; and purchase order information includes at least information for identification of the contents provider, information showing details of the order and information showing the cost.

10. The information service offering system according to claim 9, wherein the service execution device issues a bill for charging the user an amount of money in the name of the contents provider on the basis of the information for identification of the contents provider and the information showing the cost.

11. An information release service assistance method which assists development of an information release service for releasing information to a third party through a network, the method comprising preparing on the network:

a planned page provision server for providing a place where a home page for exhibiting information to be offered on the network is opened by each of a plurality of contents providers planning information release services;

a data storage server which stores fee-based digital data forming the information to be offered; and a portal site server for opening a portal site in which a link to each of home pages opened by the contents providers is registered, wherein the method provides to each of the contents providers at least one of a service enabling use of the planned page provision server, a service enabling use of the data storage server, and a service enabling registration in the portal site on the basis of a contract, wherein at least one of the plurality of contents providers receives purchase order information relating to the purchase of the fee-based digital data, and wherein a service execution device processes the purchase order information.

12. The information release service assistance method according to claim 11, wherein an advertisement service is executed to provide a place for advertisement to at least one contents provider under a contract for use of the planned page provision server.

13. The information release service assistance method according to claim 12, wherein:

the service execution device is prepared to assist each contents provider in carrying out an information selling service such that information exhibited on the home page opened by the contents provider is offered for pay at a request from a user, the execution device operating associably with the home pages opened by the contents providers to perform centralized management of orders accepted through the home pages, converting the information designated by each order into a predetermined form in accordance with the order such as to be receivable by the corresponding user, and delivering the converted data to the user; and the service execution device executes the information selling service for the contents provider on the basis of the contract.

14. An information service offering system for realizing a service to receive information from contributors through a network and to offer the contributed information to a third party for pay, the information service offering system comprising:

an information sharing server for managing information communicated from contributors, planners who plan services and service users who will purchase contributed information and are collectively and communicably connected to each other through a network; and a service execution device which executes provision of information to a service user on the basis of a request from the service user, wherein:

the information sharing server comprises:

a plan registration device which registers information about each of the planners at a request from the planner;

a plan exhibition device which shows planned pages opened by the planners to the service users;

a contributor management device which manages the contributors who contribute information to the planned pages;

a contributed information management device which manages the information contributed by the contributors;

a service management device which accepts orders from the service users and manages in accordance with each order the corresponding service executed by the service execution device;

a profit management device which manages a profit obtained as a charge for use of each service;

a service use instance totalization device which totalizes instances of use of the service registered on the information sharing server and developed by each planner and instances of use of the contributed information with respect to each planner and with respect to each contributor; and a profit return amount computation device which computes, on the basis of the results of totalization obtained by the service user instance totalization device, an amount of money to be returned to each planner and an amount of money to be returned to each contributor as portions of a profit made by setting the contributed information;

wherein data for application of registration of each planned page and the corresponding planner information in the information sharing server is received from the planners by the information sharing server;

wherein contributed information treated as an object to be offered for pay and corresponding contributor information is received by the information sharing server from the contributors; and wherein order data from the service users for purchasing desired contributed information by accessing the corresponding planned page opened by the planner is received by the information sharing server.

15. The information service offering system according to claim 14, wherein:

the planned page of each planner is opened on the information sharing server; and the information sharing server provides planned page making assistant device which assists the planner in constructing the planned page on the information sharing server.

16. The information service offering system according to claim 14, wherein:

a contract relating to the amount of money to be returned is made at the time of planner registration and at the time of contributor registration; and the amount to be returned is computed in accordance with the contract.

17. The information service offering system according to claim 14, wherein the information sharing server further comprises a device which periodically notifies each planner and each contributor of the results of totalization obtained by the service use instance totalization device.

18. An information service offering method utilizing the system according to claim 14, in which a planner is assisted in realizing a service when the planner develops the service by receiving information from contributors through a network and by selling the contributed information to a third party, the method comprising preparing an information sharing server and a service execution device which actually offers a service user some of services planned by planners and registered in the information sharing server, and inviting registration of plans in the information sharing server.

* * * * *